(12) United States Patent
Itabashi et al.

(10) Patent No.: US 6,356,716 B1
(45) Date of Patent: Mar. 12, 2002

(54) CAMERA HAVING OPERATION MEMBER ON REAR COVER THEREOF, VARIABLE PICTURE SIZE CAMERA AND PICTURE SIZE SWITCHING MECHANISM, AND CLICK STOP MECHANISM

(75) Inventors: Tomoaki Itabashi, Saitama; Kosei Kosako, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/248,746

(22) Filed: Feb. 10, 1999

(30) Foreign Application Priority Data

| Feb. 10, 1998 | (JP) | ............................................ 10-028383 |
| Feb. 10, 1998 | (JP) | ............................................ 10-028384 |
| Feb. 10, 1998 | (JP) | ............................................ 10-028385 |
| Feb. 10, 1998 | (JP) | ............................................ 10-028386 |

(51) Int. Cl.$^7$ ............................................... G03B 17/02
(52) U.S. Cl. ........................ 396/299; 396/435; 396/543
(58) Field of Search ................................ 396/297, 299, 396/435, 436, 543, 280

(56) References Cited

U.S. PATENT DOCUMENTS 5,515,124 A * 5/1996 Kurosawa et al. .......... 396/399
5,523,813 A * 6/1996 Manabe et al. ............. 396/299

* cited by examiner

Primary Examiner—David M. Gray
(74) Attorney, Agent, or Firm—Greenblum & Bernstein, P.L.C.

(57) ABSTRACT

A camera having a rear cover with an operation member thereon, includes an electrical signal generation device and a mechanical operation device, provided in a camera body; a movable common operation member provided on the rear cover of the camera to actuate the electrical signal generation device and the mechanical operation device; a movable association member in the camera body, which is moved in accordance with the movement of the common operation member when the rear cover is closed, to actuate both the electrical signal generation device and the mechanical operation device; a biasing member on the rear cover, for holding the common operation member at a predetermined position when the rear cover is opened, regardless of the position of the common operation member when the rear cover has been closed; and a biasing member on the camera body, for holding the association member at a predetermined position when the rear cover is opened, regardless of the position of the common operation member when the rear cover has been closed.

28 Claims, 30 Drawing Sheets

CAMERA HAVING OPERATION MEMBER ON REAR COVER THEREOF, VARIABLE PICTURE SIZE CAMERA AND PICTURE SIZE SWITCHING MECHANISM, AND CLICK STOP MECHANISM

BACKGROUND OF THE INVENTION

1. Field of the Invention

The present invention relates to a camera having an operation member on a rear cover thereof, a camera whose picture size is variable and a picture size switching mechanism, and a click stop mechanism.

2. Description of the Prior Art

In a known variable picture size camera in which the picture size can be switched between, for example, a standard picture size and a panoramic picture size (laterally elongated picture plane), an operation member which is adapted to turn the power source ON or OFF and an operation member which is adapted to switch the picture size are separately provided. Namely, the two operation members are independently actuated. Moreover, in a known camera having additional operation members for actuating an electrical signal generation device and a mechanical operation device, incorporated in the camera body, the operation members are separately or individually provided. Generally speaking, a simplification of the operation system has been needed to facilitate the assembly and reduce the manufacturing cost. However, for example, in a water proof camera, the separate water tight structures of the operation members for the electrical signal generation device (e.g., power switching mechanism) and for the mechanical operation device (e.g., picture size switching mechanism) makes the assembly complicate and expensive.

In the case that the operation members are provided on the rear cover of the camera, so that the electrical signal generation device or the mechanical operation device, incorporated in the camera body can be actuated from the outside of the camera body by the operation members, it is difficult to establish an interconnection between the external operation members and the internal electrical signal generation device or the mechanical operation device, etc. When the rear cover is opened, the operation members are disconnected from the corresponding internal device to be actuated. Consequently, if the operation member is actuated when the rear cover is open, there is a possibility that a positional relationship or association therebetween is broken or fails, or the rear cover cannot be closed.

One solution to prevent an appropriate association between the operation member and the internal operation mechanism to be actuated by the operation member from being broken when the rear cover is open is to bias the operation member and the internal operation mechanism toward the association or engagement position. However, in this solution, it is impossible to forcibly close the rear cover while the operation member is maintained in a position different from the engagement position. To make it possible to forcibly close the rear cover, in a conventional camera in which the internal operation mechanism of the camera is, for example, the picture size switching mechanism, a light interception frame which is adapted to vary the picture size is elastically deformed when the forced operation is carried out. However, it is not advisable to deform the light interception frame, from the viewpoint of duration and reliability of the operation thereof.

Furthermore, in a variable picture size camera, a pair of light interception frames for a panoramic picture size are provided in the vicinity of an aperture which defines a standard picture plane, so that the light interception frames can be moved in opposite directions to cover upper and lower edges of the standard picture plane to thereby vary the picture size. The light interception frames must be reliably moved between a standard picture size position in which the standard picture size is obtained and a panoramic picture size position in which a panoramic picture size is obtained, and must be firmly held in the standard picture size position or the panoramic picture size position. To this end, in conventional cameras, a reversible action biasing spring whose direction of action is reversed at a specific spring position is used to move and hold the light interception frames to and in the two extremity positions, or a unidirectional biasing spring is used to continuously bias the light interception frames toward one of the two extremity positions, so that when an external force in a direction opposite to the biasing direction is released, the light interception frames are automatically returned to the one extremity position. However, the biasing spring complicates the structure of the camera.

Moreover, in a operation mechanism, not limited to the camera, a click stop mechanism which includes a click spring and a click projection which can be disengageably engaged by the click spring is often employed to stably hold the operation member which is biased in one direction in one of specific positions so as to move the operation member from the specific position when a predetermined strength of force is applied. In a conventional click stop mechanism, the engagement of the click spring and the click projection at each specific position (engagement position) takes place only at one point thereof, thus resulting in an unstable engagement. In addition to the foregoing, in a conventional click stop mechanism, the position of engagement between the click spring and the click projection is different depending on the direction of the movement of the operation member or the engagement positions (click positions), so that an operator would sense a different amount of operation resistance.

SUMMARY OF THE INVENTION

It is an object of the present invention to provide a small, inexpensive and high operation efficiency camera in which an electrical signal generation device and a mechanical operation device are incorporated in a camera body and operation members are provided on a rear cover of the camera body, wherein an operation portion is simplified.

A second object of the present invention is to provide a small and inexpensive variable picture size camera in which the assembly can be simplified by simplifying an operation portion thereof.

A third object of the present invention is to provide a simple and inexpensive picture size switching mechanism for a variable picture size camera in which light interception frames can be reliably held at extremity positions without providing a biasing member to return the light interception frames.

A fourth object of the present invention is to make it possible to carry out a forced operation of the operation device upon closing the rear cover which has been opened (in a camera having an operation mechanism such as a picture size switching mechanism and an operation device for the same provided in a camera body and a rear cover, respectively) without burdening the operation mechanism in the camera body (e.g., picture size switching mechanism).

A fifth object of the present invention is to provide a simple click stop mechanism in which an operation member can be stably held in a specific position and an operator's sense of operation hardly changes regardless of the operation direction or operation position.

To achieve the first object of the present invention, there is provided a camera having a rear cover with an operation member thereon, including an electrical signal generation device and a mechanical operation device, provided in a camera body; a movable common operation member provided on the rear cover to actuate the electrical signal generation device and the mechanical operation device; a movable association member in the camera body, which is moved in accordance with the movement of the common operation member when the rear cover is closed, to actuate both the electrical signal generation device and the mechanical operation device; a biasing member on the rear cover, for holding the common operation member at a predetermined position when the rear cover is opened, regardless of the position of the common operation member when the rear cover has been closed; and a biasing member on the camera body, for holding the association member at a predetermined position when the rear cover is opened, regardless of the position of the association member when the rear cover has been closed.

With this arrangement, since the operation member can be commonly used, not only can the manufacturing cost be reduced but also assembly can be simplified. Moreover, since there is no phase difference between the common operation member and the member to be associated therewith when the rear cover (which has been opened) is closed, the camera is easy to handle.

Preferably, the common operation member includes a dial member which is rotatably supported by the rear cover and the association member includes a rotary plate which is supported by the camera body to rotate about the same axis as the axis of rotation of the dial member, so that the rotary plate is rotated in accordance with the rotation of the dial member when the rear cover is closed. The rotary plate can be provided with an electrical contact portion which constitutes the electrical signal generation device, and an operation cam which actuates the mechanical operation device in accordance with the angular position of the rotary plate.

For instance, the electrical signal generation device includes a power switch of the camera, and the mechanical operation device includes a picture size switching mechanism which varies the picture plane between a standard size picture plane and a laterally elongated panoramic size picture plane which is obtained by obstructing upper and lower edges of the standard size picture plane.

If the above idea is applied to a variable picture size camera, the camera would include a camera body; a rear cover which opens and closes the back of the camera body; a power switch mechanism provided in the camera body; a picture size switching mechanism provided in the camera body, which switches the picture size between a standard picture plane and a laterally elongated picture plane in which upper and lower edges of the standard picture plane are obstructed; a common operation member provided on the rear cover, which actuates the power switch mechanism and the picture size switching mechanism; and an association drive mechanism which associates the operation of the common operation member with the operations of the power switch mechanism and the picture size switching mechanism when the rear cover is closed.

Consequently, the second object of the invention, i.e., the simplification of the operation system of the variable picture size camera can be achieved.

In the variable picture size camera, preferably, the common operation member includes a dial member which is rotatably supported by the rear cover, and the association drive mechanism includes a rotary plate which is supported by the camera body to rotate about the same axis as the axis of rotation of the common operation member, so that the rotary plate is rotated to carry out the ON/OFF operation of the power switch mechanism and the switching operation of the picture size switching mechanism between the standard picture plane and the laterally elongated picture plane; and a rotation transmission mechanism for transmitting the rotation of the common operation member to the rotary plate when the rear cover is closed.

In an embodiment, the common operation member includes three engagement positions when the rear cover is closed, and the rotary plate includes three angular positions corresponding to the three engagement positions of the common operation member and consisting of a first position in which the power switch is turned OFF and second and third positions in which the power switch is turned ON, so that the standard picture plane is held at the power-OFF position and one of the power-ON positions, and the laterally elongated picture plane is held at the other power-ON position. The common operation member and the rotary plate can be biased toward angular positions in which the operation states thereof correspond to each other and can be returned to respective biasing positions when the rear cover is opened. Preferably, the common operation member and the rotary plate are biased toward angular positions corresponding to the power-OFF position.

In an embodiment, the power switch mechanism includes a plurality of electrical contacts provided in the camera body, and electrical contact pieces which are provided on the rotary plate and are selectively brought into sliding contact with the electrical contacts in accordance with the angular position of the rotary plate.

Preferably, the picture size switching mechanism includes a stationary standard picture plane forming member provided in front of a film surface; a pair of light interception frames which are provided with light interception portions which can obstruct upper and lower edges of the standard picture plane and which are movable in the upward and downward direction of the standard picture plane to selectively define the standard picture plane or the laterally elongated picture plane; a light interception frame association mechanism which moves one of the light interception frames symmetrically with the other light interception frame with respect to the center of the picture plane when the other light interception frame is moved in the upward and downward direction; and a biasing spring which biases the light interception frames toward a position corresponding to the standard picture plane. The rotary plate can be provided with an operation cam which presses a follower pin provided on one of the light interception frames at a predetermined angular position to thereby move the light interception frames to a position corresponding to the laterally elongated picture plane.

The variable picture size camera can be provided with a finder optical system separate from a photographing optical system. The finder optical system can be provided therein with a field frame switching device which switches a finder field corresponding to the standard picture plane and a finder field corresponding to the laterally elongated picture plane in accordance with the operation of the common operation member.

Preferably, the field frame switching device mechanically moves a field frame forming member provided in the finder optical system, due to the moving force of the light interception frames. In an embodiment, the field frame switching device can be composed of a liquid crystal display whose transparent area can be selectively varied to define a field corresponding to the standard picture plane and a field corresponding to the laterally elongated picture plane, in accordance with the voltage supplied thereto, so that the electrical contact pieces provided on the rotary plate are in sliding contact with the electrical contact portion provided in the camera body to produce an electrical signal in accordance with the angular position of the rotary plate, whereby the voltage to be supplied to the liquid crystal display is controlled in accordance with the electrical signal to selectively form the field corresponding to the standard picture plane or the laterally elongated picture plane.

The camera having a rear cover with an operation member thereon and the variable picture size camera are preferably water-proof/drip-proof in which the common operation member and the rear cover are sealed in water-tight fashion.

The above mentioned basic idea of the present invention can be applied to a camera in which the common operation member, the power switch mechanism and the picture size switching mechanism are not separately provided on the rear cover and in the camera body. Namely, the operation system can be simplified since the common operation member can actuate both the power switch mechanism and the picture size switching mechanism.

To achieve the third object of the present invention, there is provided a picture size switching mechanism for a variable picture size camera in which a picture plane can be switched between an elongated standard picture plane and a laterally elongated picture plane in which upper and lower edges of the standard picture plane are obstructed, including a stationary standard picture plane forming member provided in front of a film surface; a pair of light interception frames which are provided with light interception portions which can obstruct upper and lower edges of the standard picture plane and which are movable in the upward and downward direction of the standard picture plane to selectively define the standard picture plane or the laterally elongated picture plane; a light interception frame association mechanism which moves one of the light interception frames symmetrically with the other light interception frame with respect to the center of the picture plane when the other light interception frame is moved in the upward and downward direction; a follower pin provided on one of the light interception frames; a rotatable cam member which is supported by the camera body to rotate about an axis substantially perpendicular to the picture plane; and first and second cam surfaces provided on the cam member, which are adapted to press the follower pin in accordance with the angular position of the rotatable cam member to thereby hold the light interception frames in positions corresponding to the standard picture plane and the laterally elongated picture plane, respectively.

With this arrangement, since the laterally elongated picture plane is obtained and held by the cam surfaces of the rotatable cam member, it is not necessary to provide a biasing member for the light interception frames, thus resulting in a simplification of the picture size switching mechanism.

In the picture size switching mechanism for a variable picture size camera, the first cam surface which is adapted to hold the light interception frames in the standard picture plane forming position includes an arched cam surface whose center is located on the axis of rotation of the rotatable cam member.

To achieve the fourth object of the present invention, there is provided a variable picture size camera including: a camera body; a rear cover which opens and closes the back of the camera body; a picture size switching mechanism provided in the camera body to switch a picture size; a picture size varying member which is supported on the surface of the camera body opposed to the rear cover and which is reciprocally moved in opposite directions to actuate the picture size switching mechanism; an operation member provided on the rear cover, which is selectively moved to a plurality of positions corresponding to the position and direction of the movement of the picture size varying member; a biasing member for biasing the picture size varying member and the operation member and holding the picture size varying member and the operation member in the respective engagement positions when the rear cover is open; and a retraction mechanism which deforms at least one of the picture size varying member and the operation member so that the rear cover which has been opened can be closed when the operation member is located in a position different from the engagement position established by the biasing member.

With this structure, if the forced operation such as the holding of the operation member at a position different from the biasing position upon the closure of the rear cover being attempted, the rear cover can be reliably closed due to the retraction mechanism.

The retraction mechanism can include an elastically deformable plate having a free end, which is provided on the picture size varying member and which is deformable in the direction substantially perpendicular to a plane defined by the movement of the picture size varying member; and an insertion projection provided on the operation member, which is inserted in the camera body when the rear cover is closed. The insertion projection can be engaged by the free end of the elastically deformable plate so as to transmit the movement of the operation member to the picture size varying member when the operation member is located in the engagement position by the biasing member upon closure of the rear cover, and the insertion projection is adapted to press and deform the elastically deformable plate in the direction substantially perpendicular to plane of the movement of the picture size varying member when the operation member is located in a position other than the engagement position upon closure of the rear cover.

Preferably, the elastically deformable plate is bent at the body portion of the picture size varying member so that the elastically deformable plate extends close to the rear cover toward the free end thereof. In this embodiment, the insertion projection of the operation member is provided with an arched surface portion which can contact with the elastically deformable plate to press and move the bent portion thereof.

In an embodiment, the picture size switching mechanism can switch the picture plane between the standard picture plane and the laterally elongated picture plane which is defined by an obstruction of upper and lower edges of the standard picture plane, and the biasing member biases the operation member and the picture size varying member toward respective standard picture plane forming positions. Consequently, upon closure of the rear cover which has been opened, the insertion projection is inserted in the camera body due to the presence of the bent portion without deforming the elastically deformable plate when the operation member is held in a laterally elongated picture plane forming position, and the insertion projection presses and deforms the bent portion of the elastically deformable plate when the operation member is returned from the laterally elongated picture plane forming position to the engagement position.

The camera body can be provided therein with a contact plate for an electric switch, and the elastically deformable plate is formed with electrical contact pieces integral therewith, which are in sliding contact with the contact plate in accordance with the movement of the picture size varying member. With this embodiment, the number of the elements can be reduced. Preferably, the operation member and the picture size varying member are supported on the rear cover and the camera body so as to rotate about the same axis.

If the picture size switching mechanism and the picture size varying member are replaced with another operation mechanism and a moving member on the camera body, in a camera having the retraction mechanism mentioned above, the invention can be applied to a camera other than the variable picture size camera, provided that the operation member is provided on the rear cover.

The present invention is also directed to a click stop mechanism comprising an operation member which is movable in opposite directions relative to a stationary member; a biasing member which biases the operation member in one direction; and a click spring and a click projection, one and the other of which are provided on the operation member or the stationary member respectively, to hold the operation member at a specific operation position against the biasing member.

According to the feature of the present invention, a pair of click projections are provided corresponding to the specific operation position, and the click spring is provided with a pair of stops corresponding to the pair of click projections. Consequently, in comparison with a conventional click stop mechanism in which the click spring and the click projection engage with each other at only one click position, a more stable engagement at the click positions can be obtained.

Preferably, the pair of click projections have sectional shapes which are line-symmetrical with respect to a median line perpendicular to the direction of the movement of the moving member; and wherein half of the cross sectional shape of each click projection is asymmetrical with the other half thereof with respect to a center line taken down the middle of the width thereof, the center line being parallel to the median line.

Consequently, an operator's operation sense of resistance upon clicking is substantially the same in forward and return directions.

The pair of click projections can be each provided with a positioning surface substantially perpendicular to the direction of the movement of the moving member and an oblique surface inclined with respect thereto. The stops of the click spring can be each provided with an upright portion corresponding to the positioning surface, and an obliquely bent portion corresponding to the oblique surface. Preferably, the click spring is provided with a base plate portion extending substantially parallel with the direction of the movement of the operation member, and the upright portions and the obliquely bent portions are formed by bending the base plate portion at predetermined angles.

In an embodiment, a plurality of specific operation positions of the operation member are provided, and a pair of click projections and a pair of stops of the click spring are provided for each specific operation position to hold the operation member.

In an embodiment, the operation member includes a rotary member which rotates about an axis.

The operation member is preferably supported on a rear cover of a camera and the click projections are provided on the surface of a camera body that is opposed to the rear cover.

The present disclosure relates to subject matter contained in Japanese Patent Applications Nos. 10-28383, 10-28384, 10-28385 and 10-28386, all filed on Feb. 10, 1998, which are expressly incorporated herein in their entireties.

BRIEF DESCRIPTION OF THE DRAWINGS

The invention will be discussed below in detail with reference to the accompanying drawings, in which.

DESCRIPTION OF THE PREFERRED EMBODIMENTS

Figure 1:
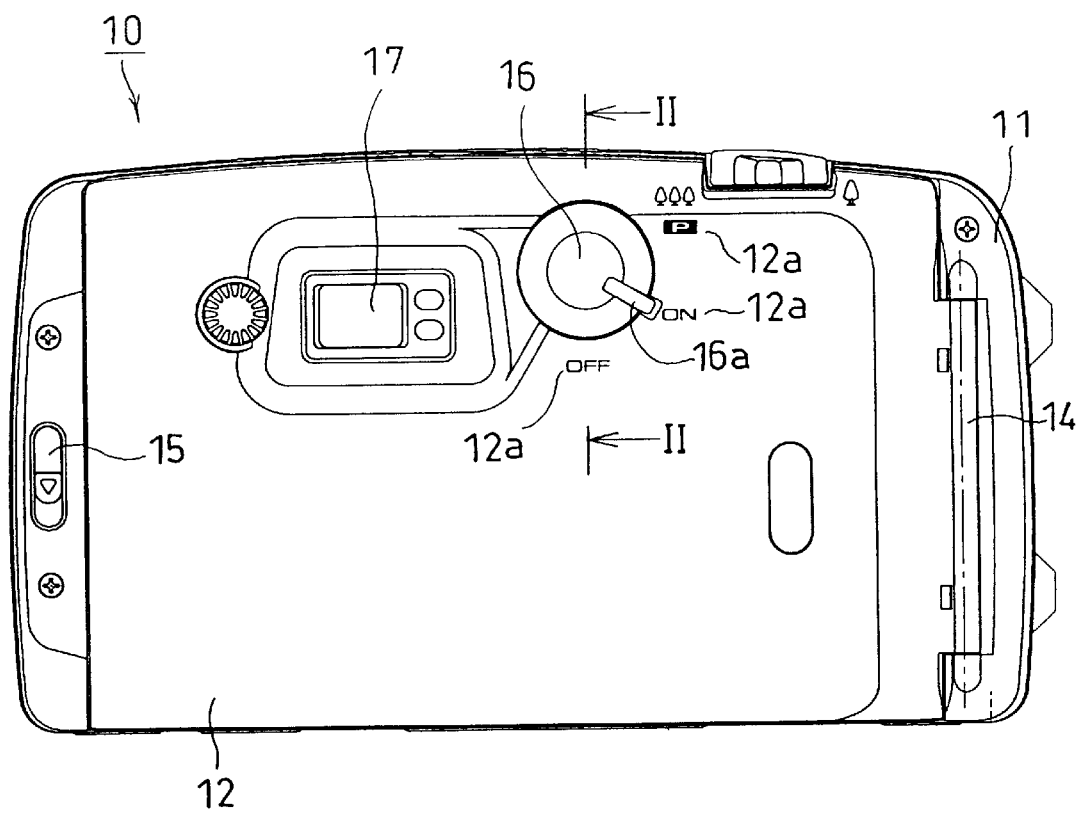
FIG. 1 is a rear view of a variable picture size camera having an operation member on a rear cover thereof, according to the present invention.

In FIG. 1 which shows a rear view of a water-proof/drip-proof compact zoom camera 10 to which the present invention is applied, a substantially entire rear surface of a camera body 11 (stationary member) is covered by a rear cover 12. There is a seal packing 13 (FIG. 2) between the camera body 11 and the rear cover 12 to seal the same in a water-tight fashion. The camera body 11 is provided with a rear body 11a and a rear body cover 11b attached thereto. The rear body cover 11b is covered by the rear cover 12. The rear cover 12 is connected to the camera body by a hinge 14 so as to open and can be locked in a closed position by a lock mechanism (not shown). The lock of the rear cover 12 can be released by an unlocking lever 15 provided on the camera body 11.

The compact zoom camera 10 has a finder optical system separate from a photographing optical system, so that an object image formed by the finder optical system can be viewed through a view window 17 formed on the rear cover 12.

The rear cover 12 rotatably supports thereon a common operation dial (movable common operation member, operation member) 16 which is adapted to switch the picture size and turn the power source of the camera ON and OFF. The common operation dial 16 is provided with a radially extending operation knob 16a. There is a picture size switching mechanism 38 and a switch mechanism 39 within the camera body 11, which are both actuated by the common operation dial 16. The common operation dial 16 and the click stop mechanism 19 therefor, and the picture size switching mechanism 38 and the switch mechanism 39 which are actuated by the common operation dial 16 will be discussed below with reference to the drawings of FIGS. 2 through FIG. 41. Note that in FIG. 3 which shows an enlarged sectional view of the common operation dial 16 and the surroundings thereof, the angular position of the common operation dial 16 is different from that shown in FIG. 2.

The common operation dial 16 is provided with a shaft portion 16b which is rotatably fitted in a support hole 12a formed in the rear cover 12. An association lever 20 and a click spring 21 are fixed to the end of the shaft portion 16b by means of a screw 22 so that the association lever 20 and the click spring 21 rotate together with the common operation dial 16. The association lever 20 is in the form of a plate which extends in the radial direction of the common operation dial 16 and abuts against the rear cover 12 to prevent the common operation dial 16 from being slipped-off from the rear cover 12. The association lever 20 is bent at its end eccentric from the axis of rotation thereof (shaft portion 16b) toward the camera body 11 to form an insertion projection 20a. An O-ring 23 made of an impermeable material is provided between the common operation dial 16 and the rear cover 12 to provide a water-tight structure therebetween.

Figure 5:
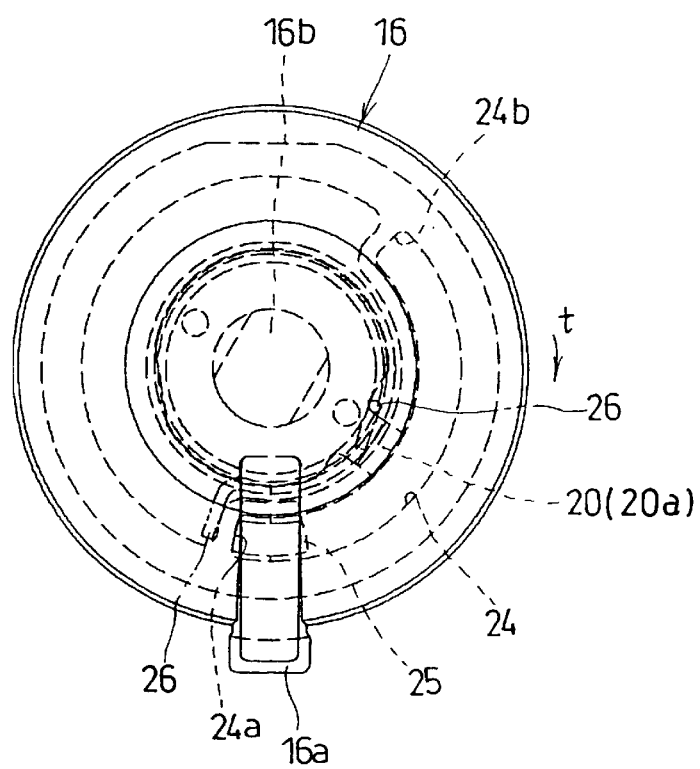
FIG. 5 is a schematic view of a common operation dial in a power off position and at a standard picture size.
Figure 7:
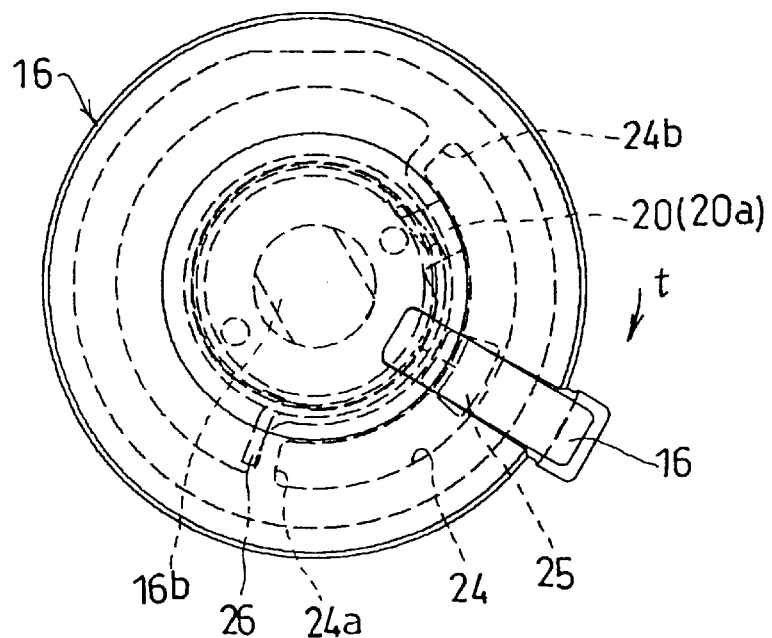
FIG. 7 is a schematic view of a common operation dial in a power ON position and at a standard picture size.
Figure 9:
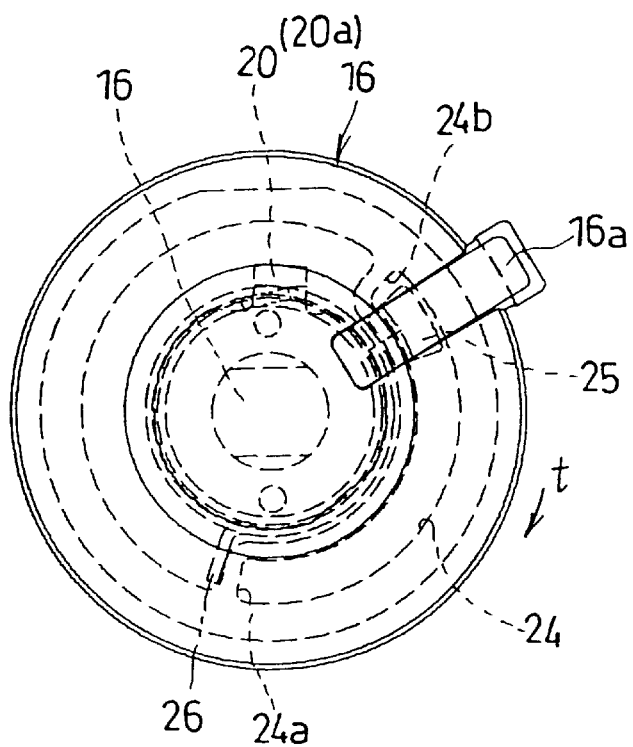
FIG. 9 is a schematic view of a common operation dial in a power ON position and at a panoramic picture size.

The rear cover 12 is provided with a rotation guide groove 24 in the form of an arc, which extends in the circumferential direction about the axis of the shaft portion 16b and which is located at a position eccentric from the axis of the shaft portion 16b. A guide projection 25 provided on the common operation dial 16 is slidably inserted in the rotation guide groove 24. As can be seen in FIGS. 5, 7 and 9, the circumferential length of the rotation guide groove 24 is slightly smaller than one-half of the perimeter of the common operation dial 16, so that the common operation dial 16 can be rotated between two extremities (angular positions) in which the guide projection 25 abuts respectively against the ends 24a and 24b of the rotation guide groove 24.

A dial biasing spring 26 is provided between the rear cover 12 and the association lever 20. The dial biasing spring 26 comes into contact with the rear cover 12 at one end and with the association lever 20 and the click spring 21 at the other end thereof. The dial biasing spring 26 biases the common operation dial 16 which is rotated together with the association lever 20 and the click spring 21 toward a rotation restriction position (FIGS. 5 and 6) in which the guide projection 25 is pressed against the end 24a of the rotation guide groove 24. The biasing direction of the dial biasing spring 26 is indicated by an arrow t.

Figure 6:
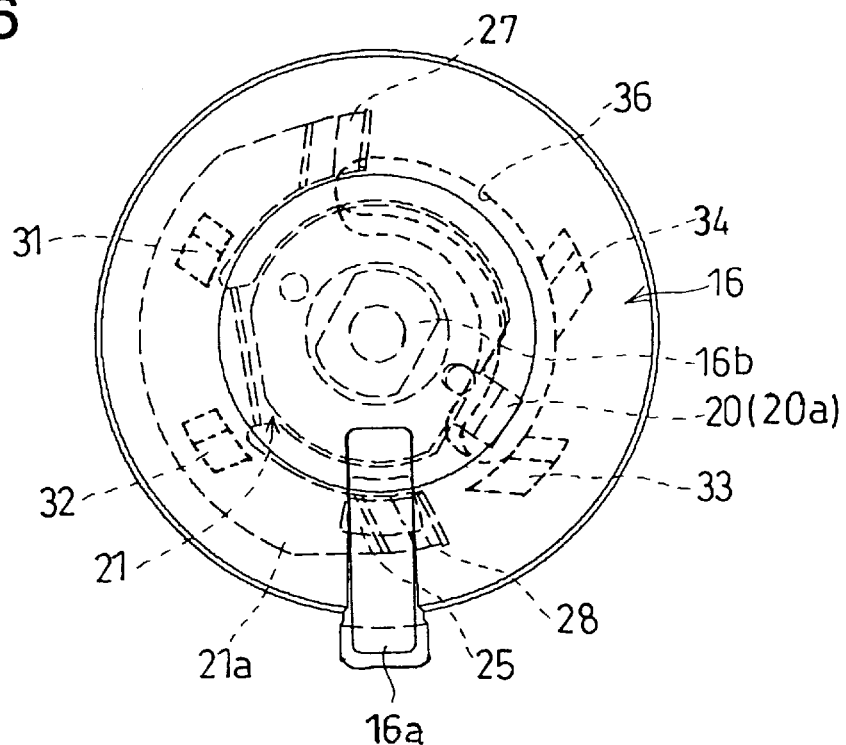
FIG. 6 is a schematic view of a common operation dial in a power OFF position and at a standard picture size.
Figure 8:
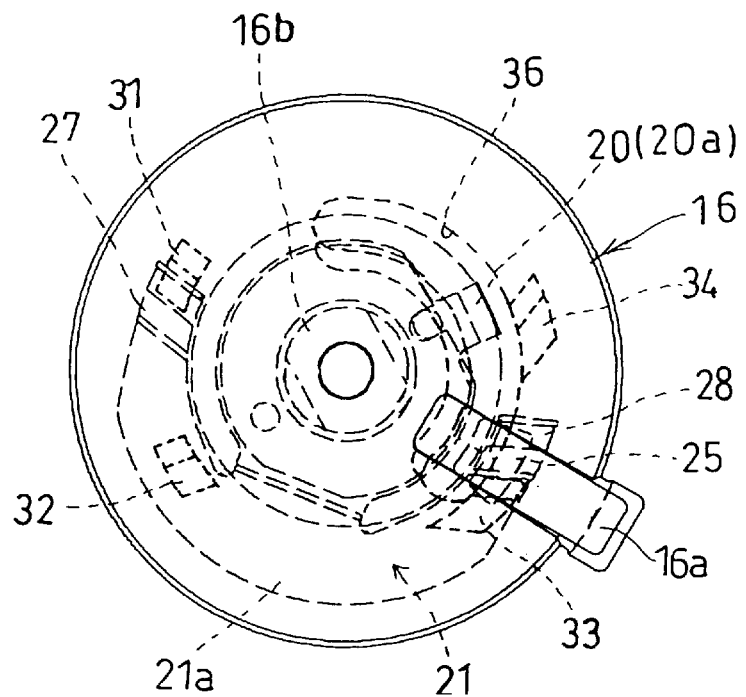
FIG. 8 is a schematic view of a common operation dial in a power ON position and at a standard picture size.
Figure 10:
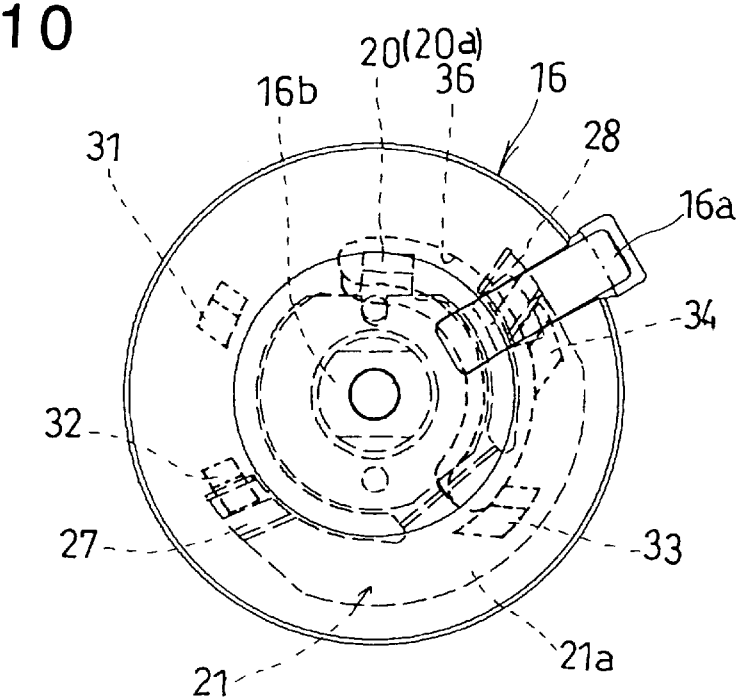
FIG. 10 is a schematic view of a common operation dial in a power ON position and at a panoramic picture size.
Figure 11:
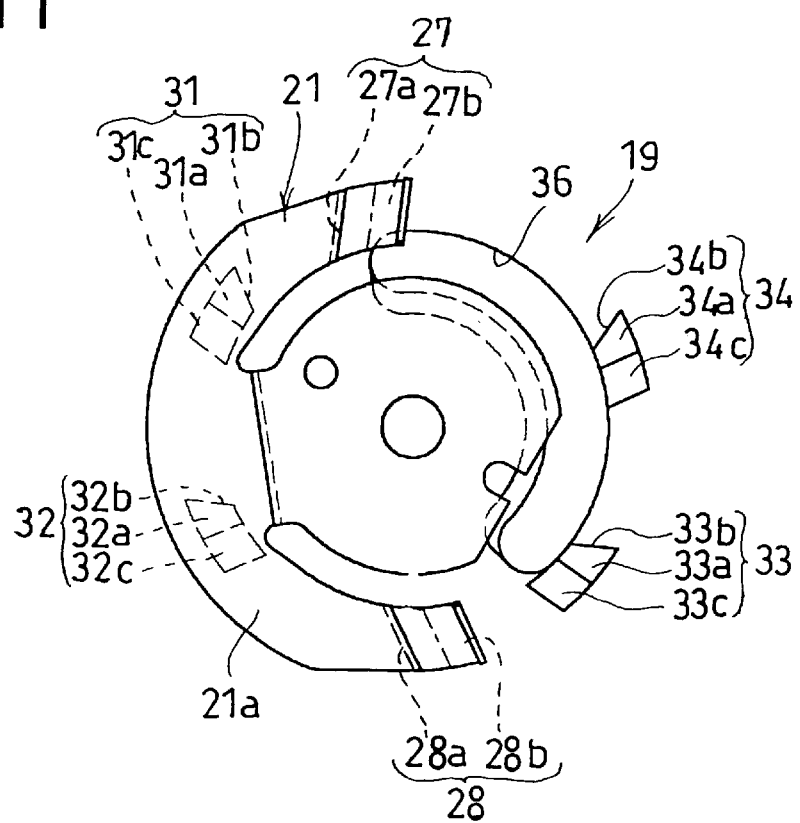
FIG. 11 is a plan view of a click plate and click projections, shown in FIG. 6.
Figure 12:
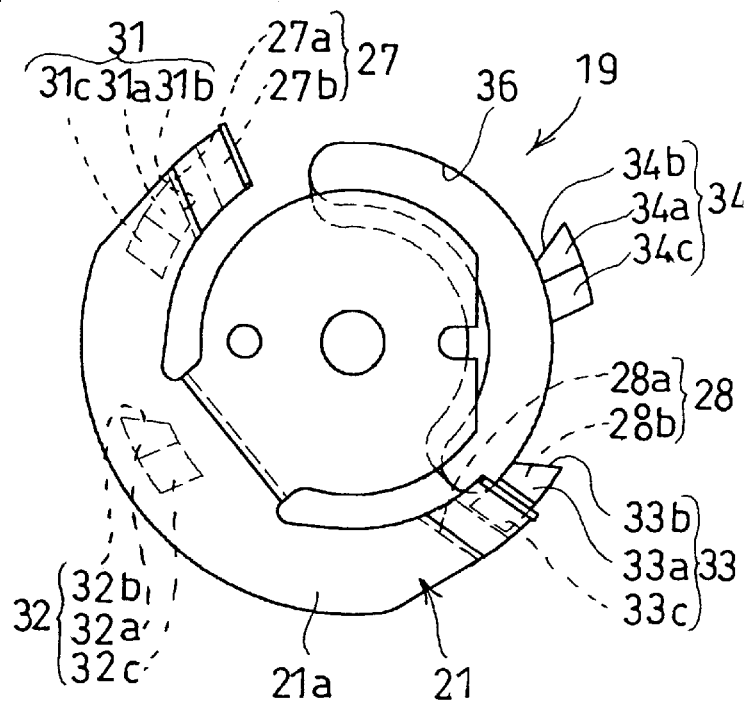
FIG. 12 is a plan view of a click plate and click projections, at an angular position of a common operation dial between FIG. 6 and FIG. 8.
Figure 13:
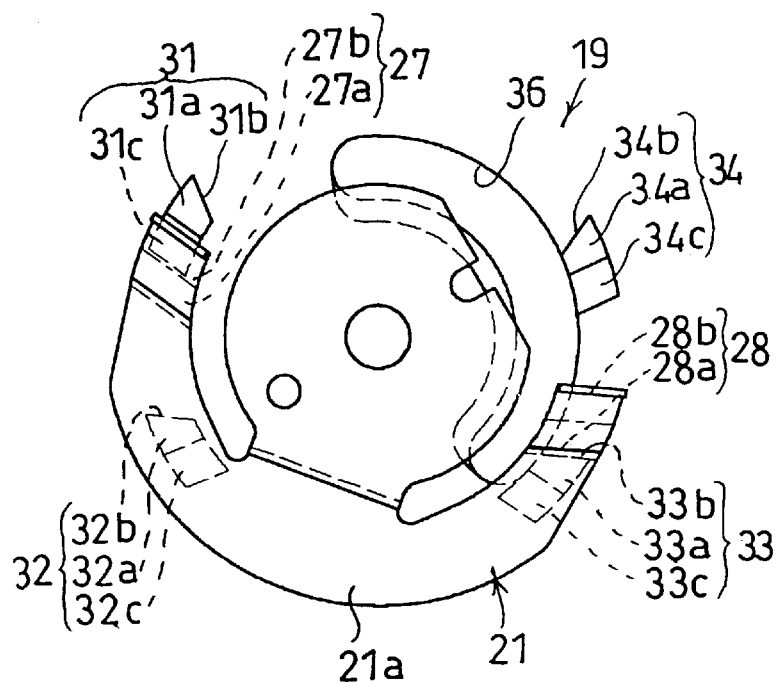
FIG. 13 is a plan view of a click plate and click projections, shown in FIG. 8.
Figure 14:
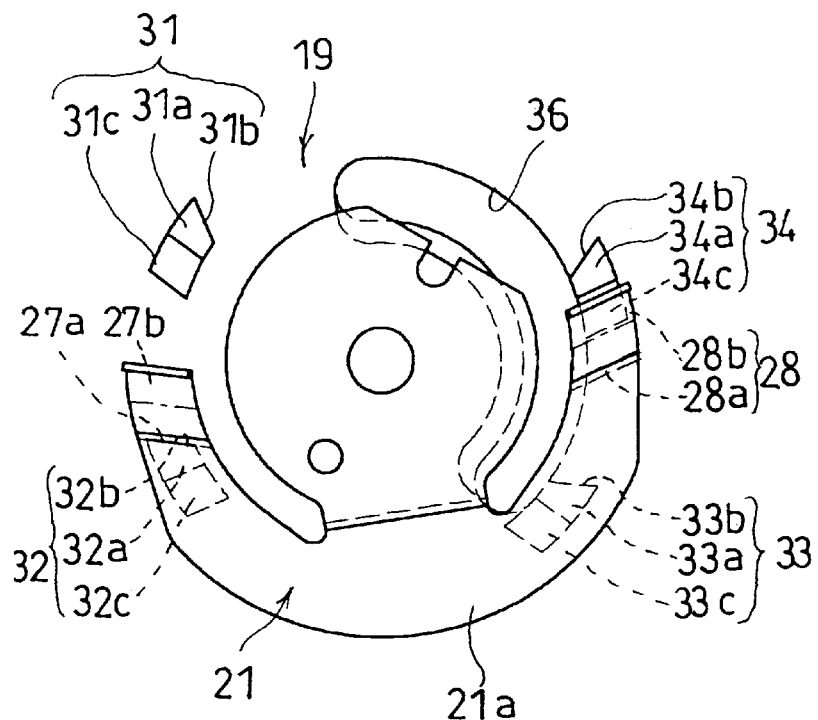
FIG. 14 is a plan view of a click plate and click projections, at an angular position of a common operation dial between FIG. 8 and FIG. 10.
Figure 15:
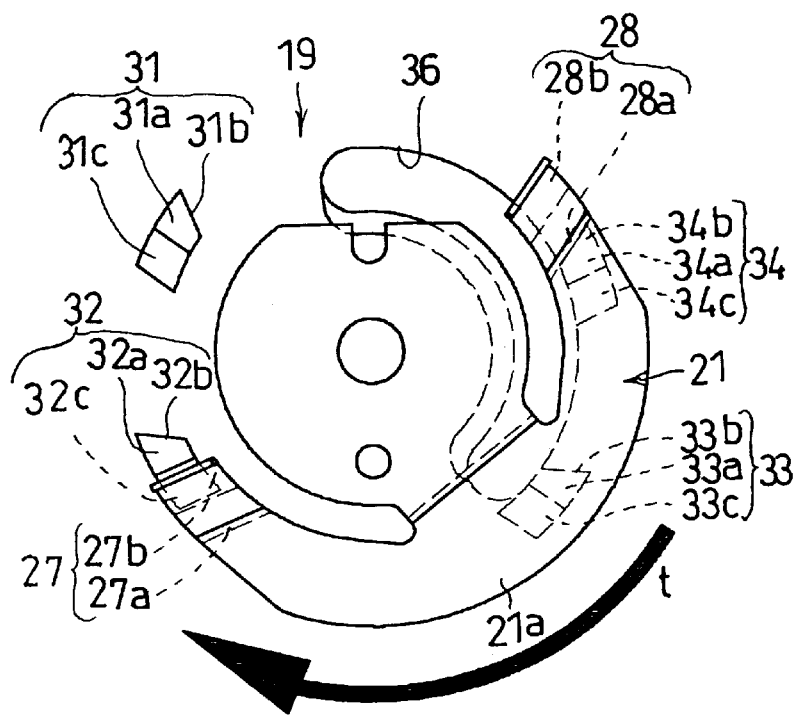
FIG. 15 is a plan view of a click plate and click projections, shown in FIG. 10.

The click stop mechanism 19 of the common operation dial 16 will be described below with reference to FIGS. 4 through 18. Note that the angular position of the common operation dial 16 is identical in FIGS. 5, 6 and 11, FIGS. 7, 8 and 13, FIGS. 9, 10 and 15, respectively. In FIGS. 5, 6 and 11, the power source of the switch mechanism 39 is turned OFF. In FIGS. 7, 8 and 13, the power source is turned ON and the picture size switching mechanism 38 is held at the standard picture size. In FIGS. 9, 10 and 15, the picture size switching mechanism 38 is switched to the panoramic picture size. The three angular positions of the common operation dial 16 will be referred to as a power-OFF position (FIGS. 5, 6, 11), a power-ON position (FIGS. 7, 8, 13), and a panoramic size position (FIGS. 9, 10, 15), respectively.

The click spring 21 is equipped with a predetermined length of a base plate portion 21a which extends along the direction of rotation thereof. The base plate portion 21a is provided on its opposed ends with a pair of stops 27 and 28. The base plate portion 21a can be elastically deformed in the direction substantially perpendicular to the plane of the click spring 21. The stop 27 is provided with an upright portion 27a bent at substantially right angles with respect to the base plate portion 21a, and an obliquely bent portion 27b which is located closer to the end than the upright portion 27a and which is inclined with respect to the base plate portion 21a. Likewise, the stop 28 is provided with an upright portion 28a and an obliquely bent portion 28b bent with respect to the base plate portion 21a.

Figure 4:
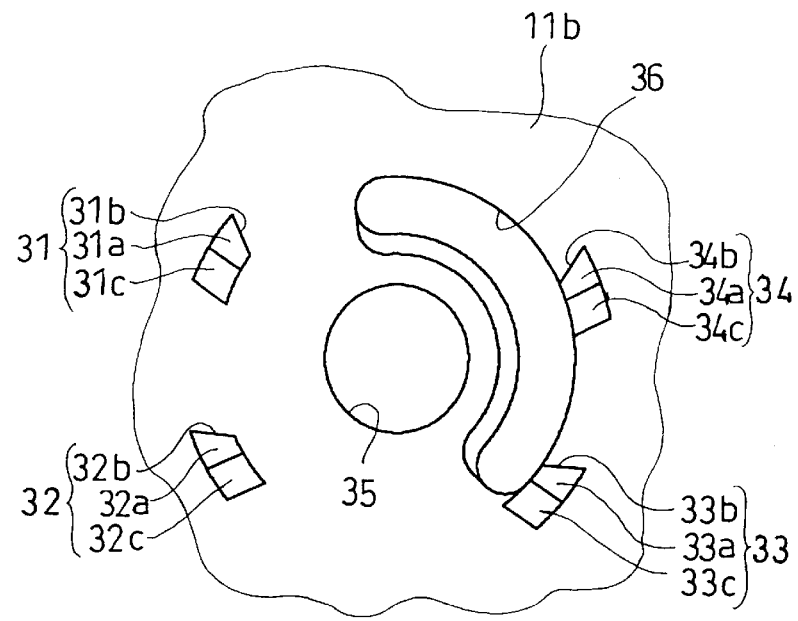
FIG. 4 is a schematic view of a click projection and the surrounding thereof, in a camera body.

As can be seen in FIG. 4, the rear body cover 11b of the camera body 11 (stationary member) is provided with four click projections 31 through 34 in the travel path of the stops 27 and 28. The click projections 31 through 34 are each provided with a flat top surface substantially parallel with the direction of the rotation of the common operation dial 16, a positioning surface substantially perpendicular to the top surface, and an oblique surface inclined with respect to the top surface and the positioning surface. Namely, half of the cross sectional shape of each click projection 31 through 34 is asymmetrical with the other half thereof with respect to a center line taken down the middle of the width thereof perpendicular to the direction of movement of the operation dial 16. In the drawings and in the following description, the top surfaces, the positioning surfaces and the oblique surfaces, of the click projections 31 through 34 are represented by suffixes "a", "b" and "c", respectively. As may be seen in the developed views shown in FIGS. 16 through 18, the click projections 31 and 33 and the click projections 32 and 34 have a line-symmetrical shape in cross section, with respect to the respective median lines perpendicular to the direction of rotation (lateral direction in the drawings) of the common operation dial 16. Note that "35" in FIG. 4 designates the recess formed in the rear body cover 11b to prevent interference with the head of the screw (bolt) 22.

In the power-OFF position, the guide projection 25 of the common operation dial 16 abuts against the end 24a of the rotation guide groove 24. In this position, the stops 27 and 28 of the click spring 21 do not engage with any of the click projections 31 through 34 (FIG. 16), and the biasing force of the dial biasing spring 26 acts in the direction t to press the guide projection 25 against the end 24a. Consequently, the common operation dial 16 and the click spring 21 are held in the angular position shown in FIGS. 5, 6 and 11.

When the common operation dial 16 is rotated from the power-OFF position in the counterclockwise direction, the bent portion 28b of the stop 28 abuts against the oblique surface 33c of the click projection 33, and the upright portion 27a of the stop 27 abuts against the positioning surface 31b of the click projection 31 (FIG. 12), respectively. If further rotation of the common operation dial 16 occurs, the click spring 21 is elastically deformed, so that the stops 28 and 27 ride over the top surfaces 33a and 31a and come to a position shown in FIGS. 13 and 17. In this position, the dial biasing spring 26 is deflected in accordance with the rotation of the common operation dial 16, so that the bent portion 27b of the stop 27 and the upright portion 28a of the stop 28 are pressed onto the oblique surface 31c of the click projection 31 and the positioning surface 33b of the click projection 33, due to the biasing force, respectively. Thus, the common operation dial 16 is engaged. In this state, the angular position of the common operation dial 16 corresponds to the power-ON position shown in FIGS. 7 and 8, in which the guide projection 25 is located substantially at the center of the rotation guide groove 24.

When the common operation dial 16 rotates further in the counterclockwise direction, the bent portion 28b of the stop 28 abuts against the oblique surface portion 34c of the click projection 34 and the upright portion 27a of the stop 27 abuts against the positioning surface 32b of the click projection 32 (FIG. 14), respectively. If further rotation of the common operation dial 16 takes place, the click spring 21 is elastically deformed, so that the stops 28 and 27 ride over the top surfaces 34a and 32a and come to a position shown in FIGS. 15 and 18. In this position, the bent portion 27b and the upright portion 28a are pressed onto the oblique surface 32c and the positioning surface 34b of the click projection 33, due to the restoring force of the dial biasing spring 26, respectively. Thus, the common operation dial 16 is engaged. In this state, the angular position of the common operation dial 16 corresponds to the panoramic size position shown in FIGS. 9 and 10, in which the guide projection 25 is located near the end 24b of the rotation guide groove 24.

In the click stop mechanism 19, the stops 27 and 28 provided at the opposed ends of the base plate portion 21a of the click spring 21 engage with the corresponding click projections at the two engagement positions of the common operation dial 16. Namely, the click spring 21 has two engagement portions for one engagement position of the common operation dial 16, thus resulting in more stable engagement than the engagement by a single engagement portion.

When the common operation dial 16 is moved between the two engagement positions, the upright portion 27a of the stop 27 abuts against the positioning surface 31b of the click projection 31 or the positioning surface 32b of the click projection 32 and rides over the same, and the bent portion 28b of the stop 28 abuts against the oblique surface 33c of the click projection 33 or the oblique surface 34c of the click projection 34 and rides over the same. Namely, the resistance exerted on the common operation dial 16 is substantially identical when the dial 16 is moved to the two engagement positions.

Conversely, if the common operation dial 16 is rotated from the position shown in FIGS. 9 and 10 in the clockwise direction, the click spring 21 is elastically deformed and the stop 27 whose bent portion 27b abuts against the oblique surface 32c rides over the top surface 32a and the stop 28 whose upright portion 28a abuts against the positioning surface 34b rides over the top surface 34a. Consequently, the click spring 21 is moved to a position shown in FIG. 17 in which the bent portion 27b abuts against the oblique surface 31c and the upright portion 28a abuts against the positioning surface 33b, respectively. The common operation dial 16 is in the angular position shown in FIGS. 7 and 8.

Figure 16:
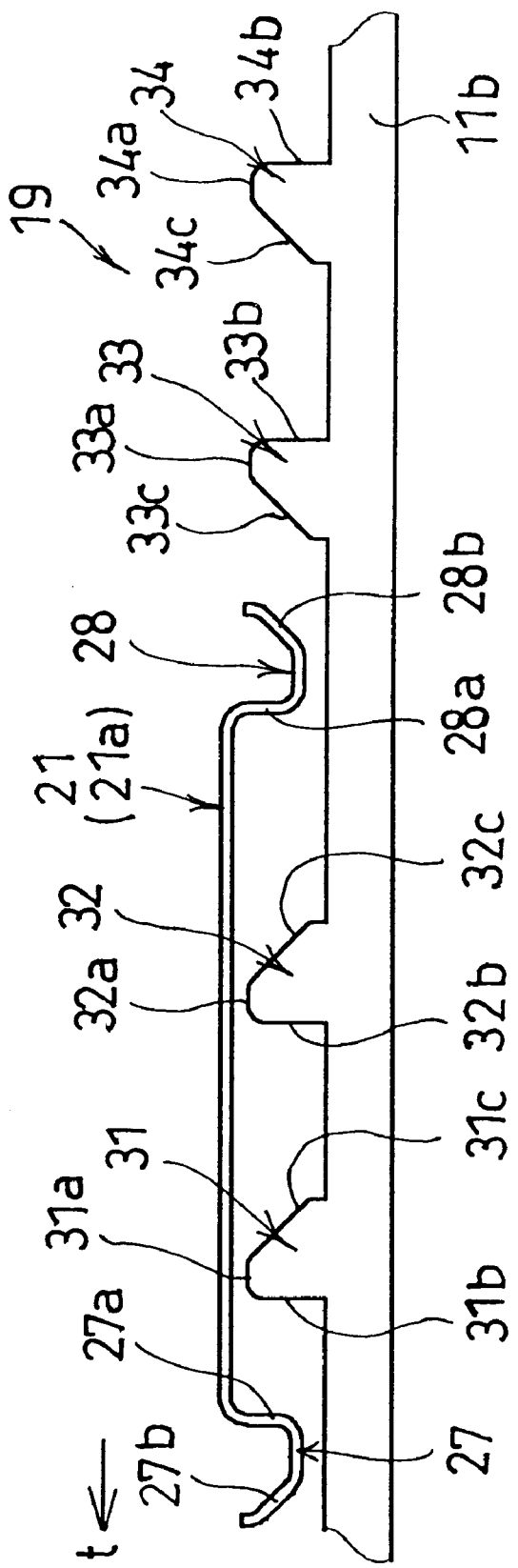
FIG. 16 is a developed side view of a click stop mechanism at an angular position of a common operation dial shown in FIG. 6.
Figure 17:
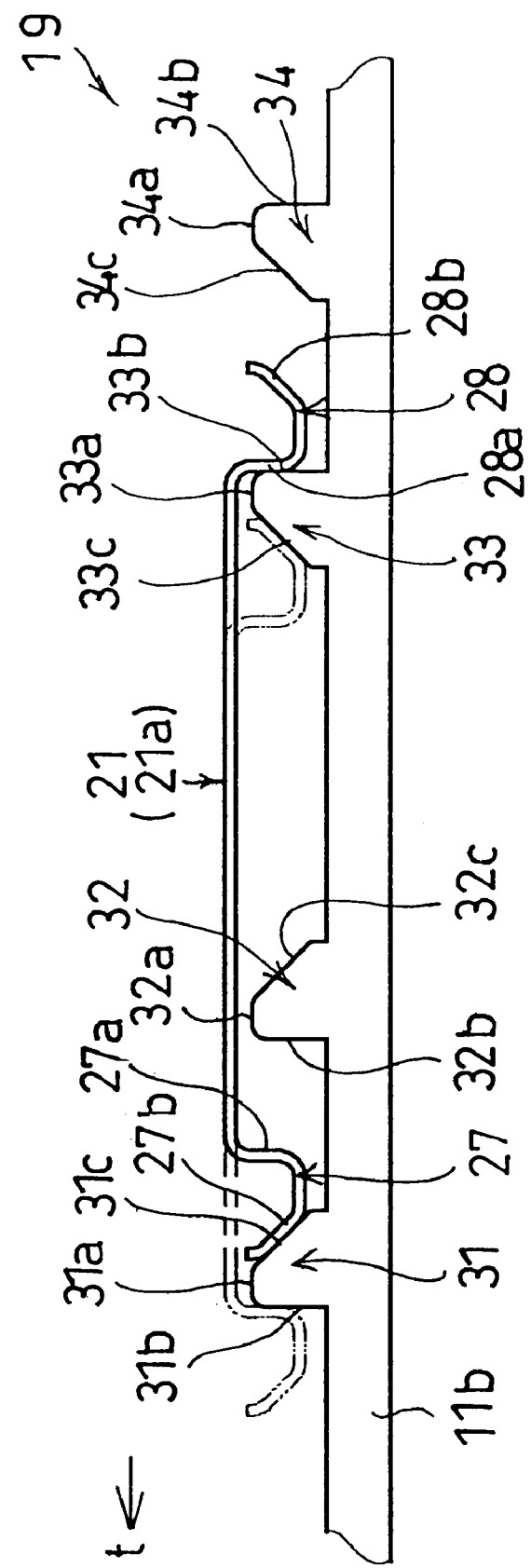
FIG. 17 is a developed side view of a click stop mechanism at an angular position of a common operation dial shown in FIG. 8.
Figure 18:
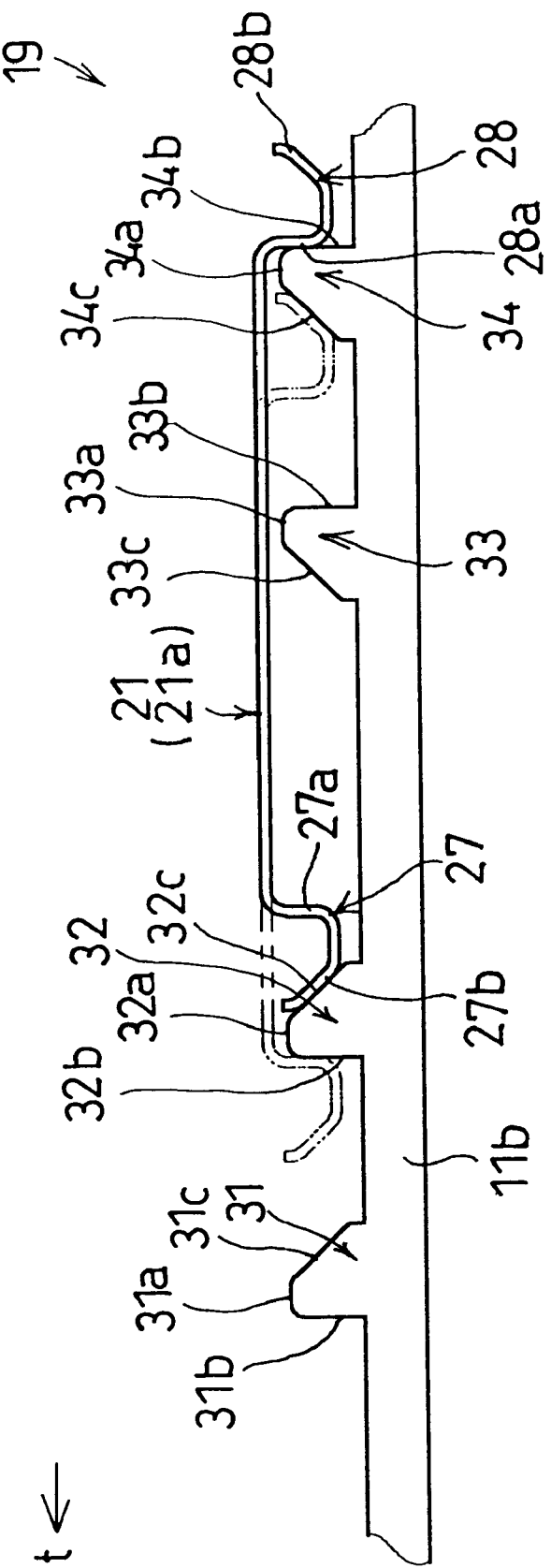
FIG. 18 is a developed side view of a click stop mechanism at an angular position of a common operation dial shown in FIG. 10.

When further rotation of the common operation dial 16 takes place, the click spring 21 is elastically deformed, so that the stop 27 whose bent portion 27b abuts against the oblique surface 31c rides over the top surface 31a and the stop 28 whose upright portion 28a abuts against the positioning surface 33b rides over the click projection 33. Consequently, the common operation dial 16 is rotated to a position shown in FIGS. 5 and 6 in which the guide projection 25 abuts against the end 24a of the rotation guide groove 24 due to the biasing force of the dial biasing spring 26. In this state, the click spring 21 does not engage with any click projection (FIG. 16).

When the common operation dial 16 is moved from one of the two engagement positions in the biasing direction, the bent portion 27b of the stop 27 rides over the oblique surface 32c or 31c, and the upright portion 28a of the stop 28 rides over the positioning surface 34b or 33b.

Therefore, the resistance exerted on the common operation dial 16 at each engagement position is substantially the same.

Moreover, in the rotation of the common operation dial 16 in the forward or reverse direction, the bent portion of one of the stops 27 and 28 abuts against the oblique surface of the click projection and the upright portion of the other stop abuts against the positioning surface of the click projection, and hence the resistance to the common operation dial is substantially identical, regardless of the direction of rotation of the common operation dial 16.

A simpler structure can be provided wherein a substantially identical resistance of the operational dial can be attained. For instance, it is possible to make the abutment surfaces of the stops of the click spring and the click projections substantially perpendicular to the direction of the movement of the operation members like the upright surfaces or the positioning surfaces. Alternatively, it is possible to provide V-shaped stops and V-shaped click projections, so that the inclined abutment surfaces on opposite sides are symmetrical. However, in the former structure, since the abutment surfaces of the stops and the corresponding click projections are parallel, if there is a manufacturing error in the precision, there is a danger that one of the stops cannot engage with the click projection. In the latter structure, since all the engagement surfaces are oblique surfaces, a stable engagement cannot be expected.

In the illustrated embodiment, since the stops and the click projections have a combination of surfaces perpendicular to the direction of the movement of the operation member and oblique surfaces inclined with respect to the same, the above-mentioned drawbacks do not occur. Namely, since the precise positioning at the engagement positions is carried out by the engagement between the upright portion provided at one end of the click spring 21 and the positioning surface of the click projection, and hence if the obliquely bent portion provided at the other end of the click spring 21 is not accurate in the dimension or inclination thereof, the bent portion can stably engage with the oblique surface of the other click projection.

In the click stop mechanism 19 constructed as above, according to the present invention, since the two engagement positions of the common operation dial 16 are obtained by the stops 27 and 28 of the click spring 21 and the corresponding click projections (31 or 33, 32 or 34), a stable engagement can be provided. Moreover, since the pair of stops 27 and 28 of the click spring 21 and the corresponding click projections (31 or 33, 32 or 34) are line-symmetrical with respect to the median lines perpendicular to the direction of the movement of the common operation dial 16, the operation resistance of the common operation dial upon engagement or disengagement of the stops 27 and 28 with or from the corresponding click projections is substantially identical, regardless of the direction of the movement of the common operation dial 16 or a plurality of operation positions. Moreover, since the click projections are asymmetrical in cross section with respect to the center line perpendicular to the direction of the movement of the common operation dial 16, the stops of the click spring can be precisely and stably engaged.

Although the common operation dial 16 is a rotary dial in the illustrated embodiment, a linear movement operation member can be used instead thereof, in the click stop mechanism according to the present invention. The operation member is not limited to one for switching the picture size or turning the power source ON or OFF. The operation member can be used for devices or equipment other than a camera. The number of the engagement positions of the operation member established by the click stop mechanism is not limited to two and can be one or more than two. Although in the illustrated embodiment the click spring and the click projections are provided on the movable operation member and the immovable member, respectively, it is possible to provide the click spring and the click projections on the immovable member and the movable operation member, respectively.

Furthermore, if a plurality of engagement positions of the movable operation member are provided, it is possible that the pair of click projections and the pair of stops of the click spring are provided for each engagement position.

The camera 10 will be further discussed below. The rear body cover 11b of the camera body 11 is provided with an association lever guide hole 36 in the form of an arc, corresponding to the insertion projection 20a of the association lever 20. The insertion projection 20a of the association lever 20 which rotates together with the common operation dial 16 is fitted in the association lever guide hole 36 when the rear cover 12 is closed, so that the picture size switching mechanism 38 and the switch mechanism 39 can be actuated. The following discussion will be addressed to the picture size switching mechanism 38 and the switch mechanism 39.

The body 11a is provided with an association rotation plate (association member, rotary plate, picture size varying member) 40 secured thereto by a screw 42, which is rotatable about an axis substantially perpendicular to the picture plane. The rotation axis of the association rotation plate 40 is identical to the rotation axis of the common operation dial 16 when the rear cover 12 is closed. The association rotation plate 40 is composed of a cam plate 40a, a contact plate 40b and a drive transmission plate 40c. The plates 40a, 40b and 40c superimpose each other and are secured to each other by a screw 40d. The drive transmission plate 40c is provided on its one end with an upright wall portion 41 which extends in a direction substantially perpendicular to the plane in which the association rotation plate 40 rotates, so that the side portion of the association lever 20 can be engaged by the upright wall portion 41.

Figure 21:
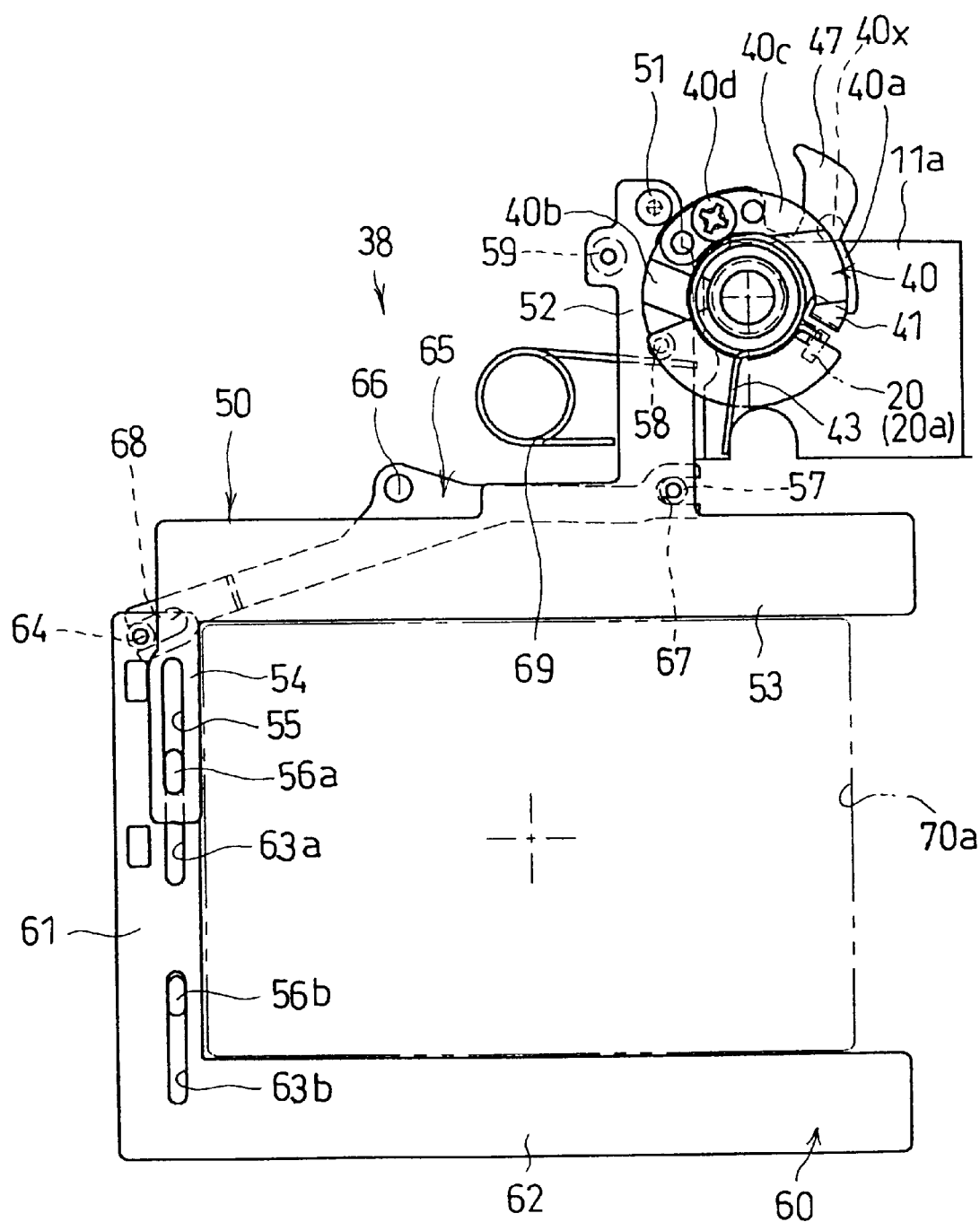
FIG. 21 is a schematic view of an association rotation plate and a picture size switching mechanism in a power OFF position and at a standard picture size.
Figure 22:
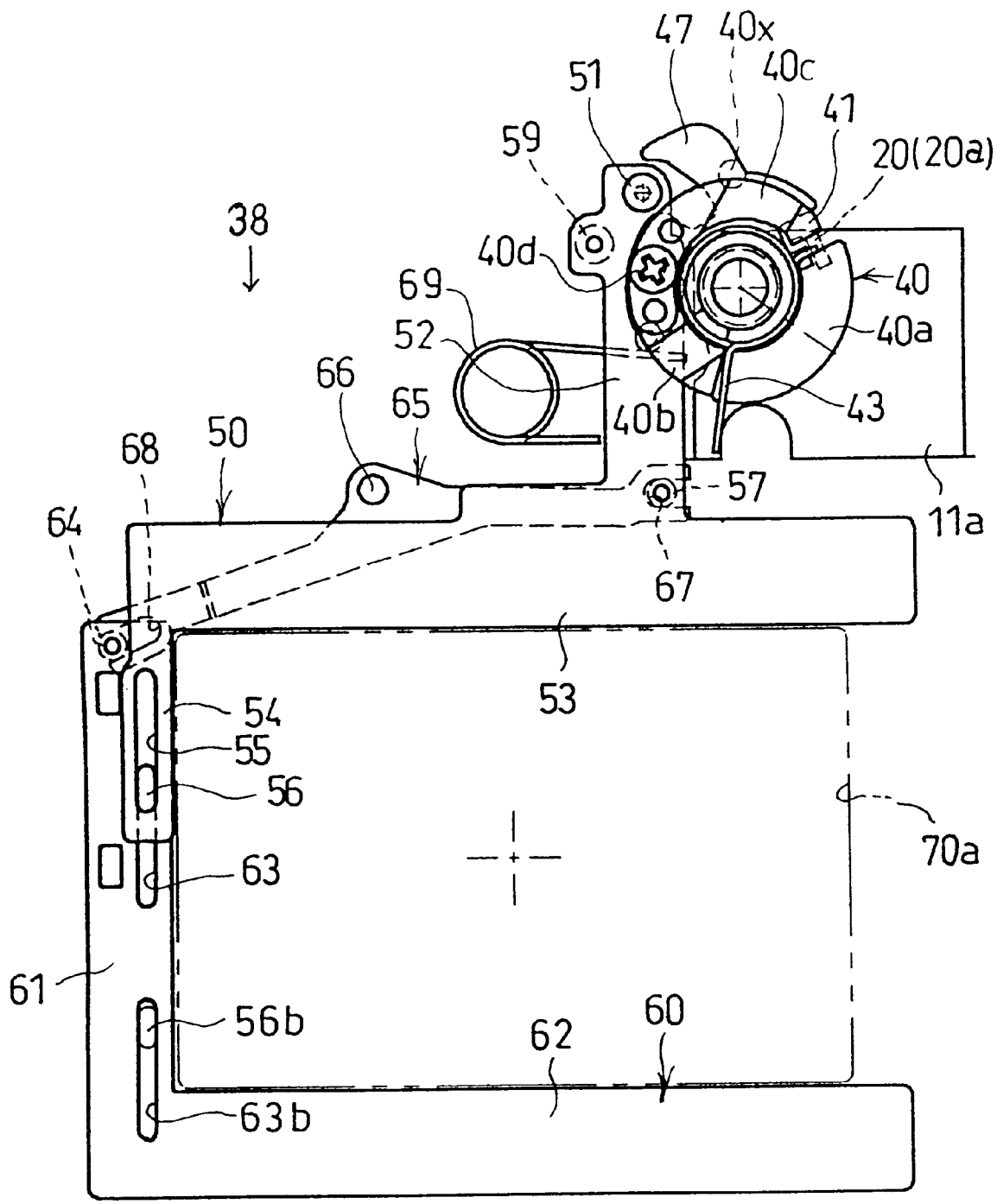
FIG. 22 is a schematic view of an association rotation plate and a picture size switching mechanism in a power ON position and at a standard picture size.
Figure 23:
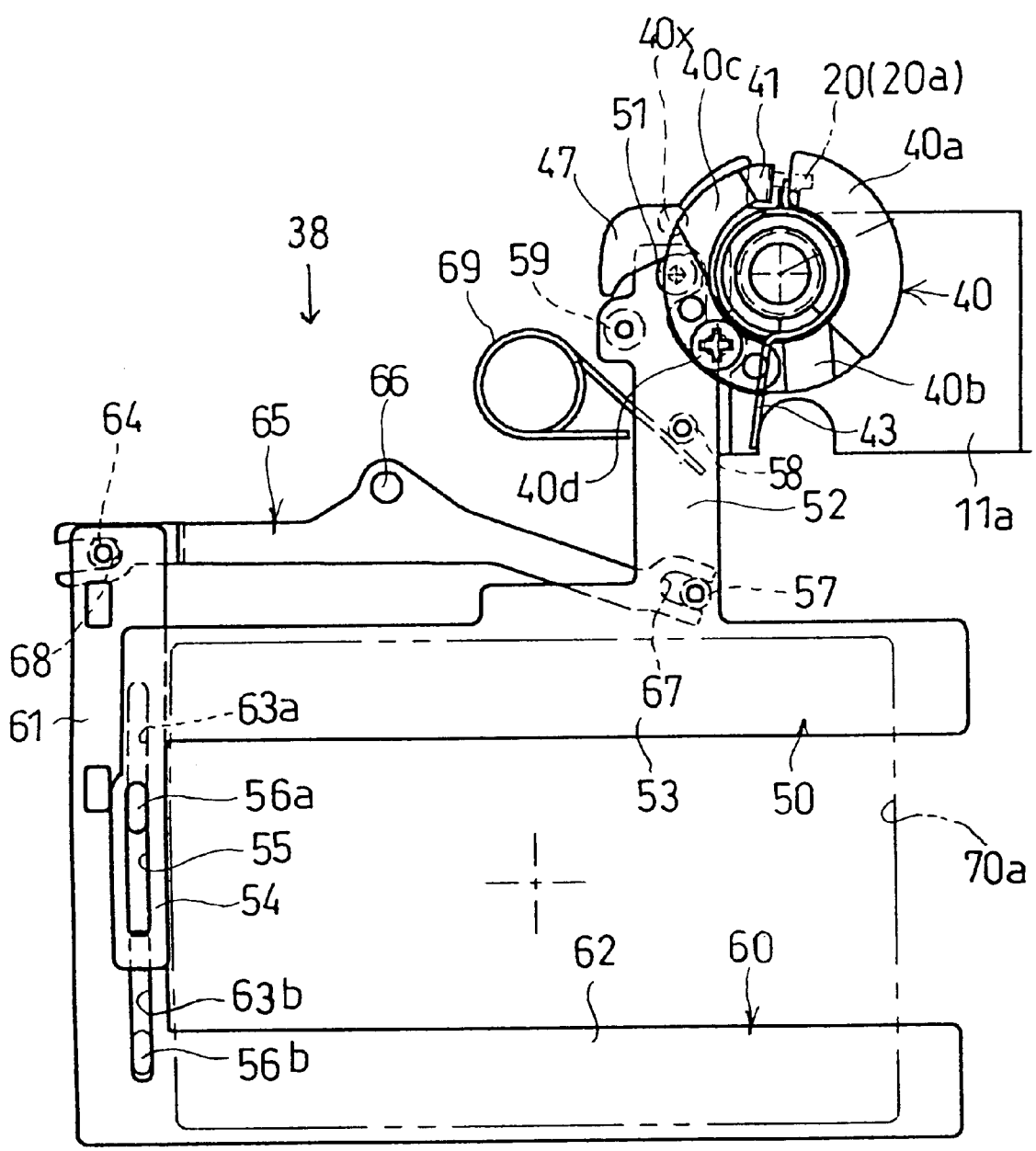
FIG. 23 is a schematic view of an association rotation plate and a picture size switching mechanism in a power ON position and at a panoramic picture size.

The association rotation plate 40 is biased to rotate in the clockwise direction in FIGS. 21 through 23, by the association plate biasing spring 43 which engages at its one end with the body 11a and at the other end with the association rotation plate 40. The cam plate 40a of the association rotation plate 40 is provided with an engagement pin 40x which can be engaged by the body 11a. The association rotation plate 40 can be held in the rotation restriction position (FIG. 21) in which the engagement pin 40x engages with the body 11a, by the association plate biasing spring 43. If the rear cover 12 is closed when the common operation dial 16 and the association rotation plate 40 are located in the rotation restriction position (FIGS. 5 and 6, FIG. 21) by the dial biasing spring 26 and the association plate biasing spring 43, respectively, the association lever 20 is inserted to engage with the upright wall portion 41 of the association rotation plate 40. When the association lever 20 is rotated in the counterclockwise direction in FIGS. 5 and 6, in accordance with the operation of the common operation dial 16, the association rotation plate 40 is pressed against the association plate biasing spring 43.

The contact plate 40b of the association rotation plate 40 is equipped on the surface thereof that faces the body 11a with contact pieces 44. The body 11a is provided with a detection substrate 45 which is capable of sliding contact with the contact pieces 44. The detection substrate 45 is provided with a land portion 45a, a first contact 45b and a second contact 45c at different positions in the radial direction and circumferential direction of the association rotation plate 40 (see FIG. 19). Each contact is connected to a control circuit of the camera through lead wires 46. The association rotation plate 40 is supported by a shaft so that the contact pieces 44 can be brought into sliding contact with each contact (FIG. 20).

The cam plate 40a of the association rotation plate 40 is provided with a panoramic size operation cam 47 which extends in the radial direction. There is a follower pin 51 of a first light interception frame 50 which can be engaged by the panoramic size operation cam 47.

Figure 2:
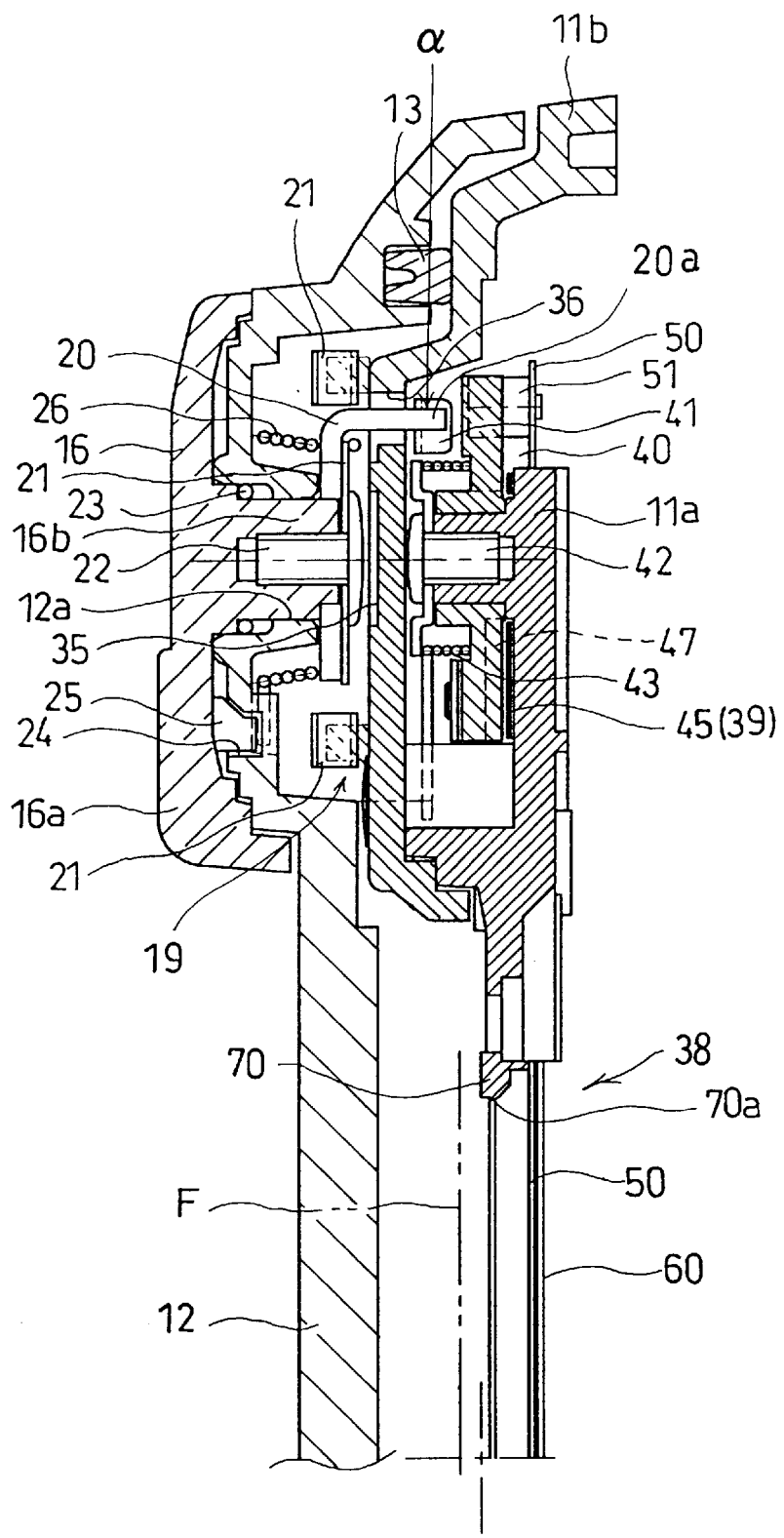
FIG. 2 is a sectional view taken along the line II—II in FIG. 1.
Figure 3:
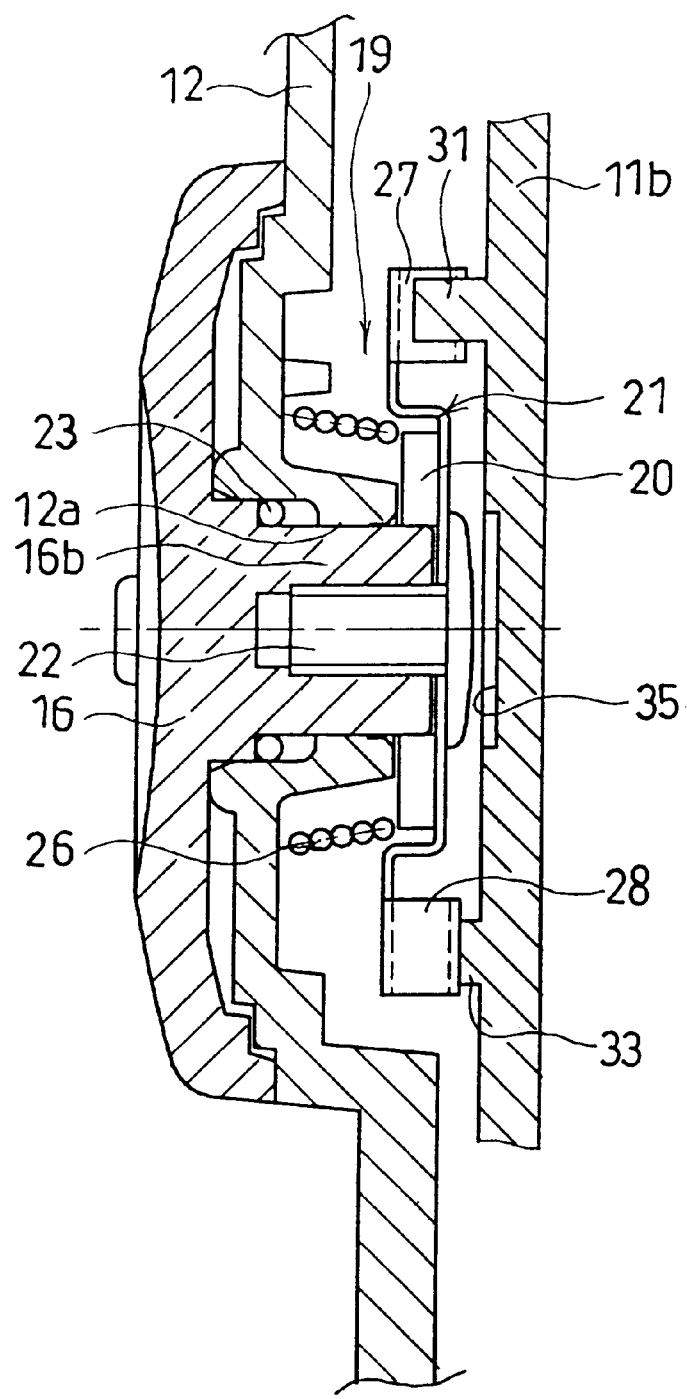
FIG. 3 is an enlarged sectional view of a common operation dial and the surroundings thereof, shown in FIG. 2.

There is a laterally elongated rectangular aperture 70a which defines a photographing area of the standard size of picture plane, by an aperture frame 70. A film F passes between the aperture frame 70 and the rear cover 12 (FIG. 2). The first light interception frame 50 is provided in front of the aperture frame 70, and is composed of an upright plate portion 52 which extends in the upward and downward direction of the camera and which is provided with the follower pin 51, an upper light interception portion 53 which is laterally elongated in parallel with the major sides of the aperture 70a, and a sliding support portion 54 which extends in parallel with the minor sides of the aperture 70a and is located out of the aperture 70a.

The sliding support portion 54 is provided with a sliding movement guide hole 55 which is elongated in a direction parallel with the minor sides of the aperture 70a. One of the sliding guide pins 56a, 56b provided on the body 11a, i.e., the guide pin 56a is slidably fitted in the elongated guide hole 55. The first light interception frame 50 is slidable in a direction parallel with the minor sides of the aperture 70a, between two extremities at which the guide pin 56a abuts against the opposed ends of the elongated guide hole 55. The upper light interception portion 53 is located out of the aperture 70a in a position in which the guide pin 56a abuts against the lower end of the elongated guide hole 55 (FIGS. 21 and 22). A predetermined amount of the upper light interception portion 53 protrudes from the upper edge of the aperture 70a into the aperture 70a in a position in which the guide pin 56a abuts against the upper end of the elongated guide hole 55 (FIG. 23).

There is a second light interception frame 60 in a plane parallel with the plane of the aperture 70a in the vicinity of the first light interception frame 50. The second light interception frame 60 is composed of a sliding support portion 61 which overlaps the sliding support portion 54 and is located out of the aperture 70a, and a lower light interception portion 62 which is elongated in parallel with the major sides of the aperture 70a. The sliding support portion 61 is provided with a sliding movement guide hole 63a corresponding to the guide hole 55 and a sliding movement guide hole 63b which is located on an extension of the guide hole 63a and is substantially parallel with the guide hole 63a. The pair of sliding guide pins 56a and 56b are slidably fitted in the corresponding guide holes 63a and 63b. The second light interception frame 60 is slidable in a direction parallel with the minor sides of the aperture 70a between two extremities in which the sliding guide pins 56a, 56b abut against the ends of the sliding guide holes 63a, 63b, respectively. The lower light interception portion 62 is located out of the aperture 70a in a position in which the guide pins 56a and 56b abut against the upper ends of the elongated guide holes 63a, 63b (FIGS. 21 and 22). The lower light interception portion 62 can protrude by a predetermined amount from the lower edge of the aperture 70a into the aperture 70a in a position in which the guide pins 56a and 56b abut against the lower ends of the elongated guide holes 63a and 63b, respectively.

The body 11a is provided with a rotation shaft 66 to which the association lever 65 is rotatably attached. The first and second light interception frames 50 and 60 are provided with association pins 57 and 64 which are fitted in recesses 67 and 68 formed at the opposed ends of the association lever 65. The first and second light interception frames 50 and 60 are associated with each other to translate in opposite directions in parallel with the minor sides of the aperture 70a in accordance with the swing movement of the association lever 65.

The upright plate portion 52 of the first light interception frame 50 is provided with a spring engagement pin 58 which extends in a direction substantially perpendicular to the direction of the movement of the first light interception frame 50. The light interception frame biasing spring 69 engages at its one end with the spring engagement pin 58. The light interception frame biasing spring 69 engages at the other end with the body 11a. The light interception frame biasing spring 69 biases the first light interception frame 50 toward the upper sliding position (FIGS. 21 and 22) in which the sliding guide pin 56a abuts against the lower end of the elongated guide hole 55. Since the second light interception frame 60 is associated with the first light interception frame 50 to move in opposite directions through the association lever 65, the second light interception frame 60 is biased toward a position (FIGS. 21, 22) in which the guide pins 56a and 56b abut against the upper ends of the elongated holes 63a and 63b.

The following discussion will be directed to the operation of the picture size switching mechanism 38 and the switch mechanism 39 in accordance with the rotation of the common operation dial 16.

The association rotation plate 40 is rotated in association with the common operation dial 16 through the association lever 20 and the upright wall portion 41. When the common operation dial 16 is in the angular position shown in FIG. 5 (FIG. 6), the association lever 20 does not engage with the upright wall portion 41, and the association rotation plate 40 is held in the angular position shown in FIG. 21 in which the association rotation plate 40 is biased by the association plate biasing spring 43. In this state, the contact pieces 44 are located in the angular position indicated by "A" in FIG. 19 in which the contact pieces 44 contact only the land portion 45a, and the power source of the camera is OFF.

As can be seen in FIG. 21, the picture size switching mechanism 38 is held in the upper position in which the upper light interception portion 53 of the first light interception frame 50 is retracted out of the aperture 70a by the biasing force of the light interception frame biasing spring 69. At the same time, the second light interception frame 60 which is associated with the first light interception frame 50 through the association lever 65 is held in the lower position in which the lower light interception portion 62 is retracted out of the aperture 70a. Consequently, the standard picture size defined by the aperture 70a is obtained.

When the common operation dial 16 is rotated to the click position shown in FIG. 7 (FIG. 8), the upright wall portion 41 is pressed by the association lever 20 to rotate the association rotation plate 40. Consequently, the contact position between the contact pieces 44 and the detection substrate 45 is moved to the position "B" in FIG. 19. In this position, the electrical connection between the land portion 45a and the first contact 45b is established by the contact pieces 44, so that the power source of the camera is turned ON.

In this state (FIG. 22), the panoramic size operation cam 47 of the association rotation plate 40 does not contact with the follower pin 51, so that the picture size switching mechanism 38 is not driven. Consequently, the standard picture size defined by the aperture 70a is maintained.

When the common operation dial 16 is rotated to the click position shown in FIG. 9 (FIG. 10), the association rotation plate 40 is further rotated through the insertion projection 20a of the association lever 20, so that the panoramic size operation cam 47 presses the cam follower pin 51. Consequently, the first light interception frame 50 is moved downward against the biasing force of the biasing spring 69, so that the upper light interception portion 53 is moved into the aperture 70a as shown in FIG. 23. At the same time, the second light interception frame 60 is translated in the direction opposite to the first light interception frame 50 by the association lever 65, so that the lower light interception portion 62 is moved into the aperture 70a. Consequently, the picture plane defines a panoramic picture size at which the upper and lower edges of the picture plane are obstructed by the upper and lower light interception portions 53 and 62.

Figure 19:
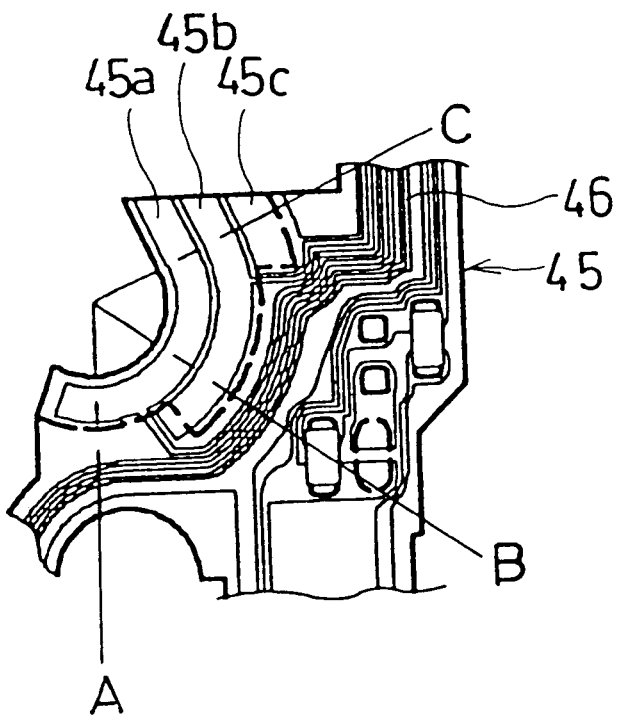
FIG. 19 is a plan view of a detection substrate provided in a camera body.
Figure 20:
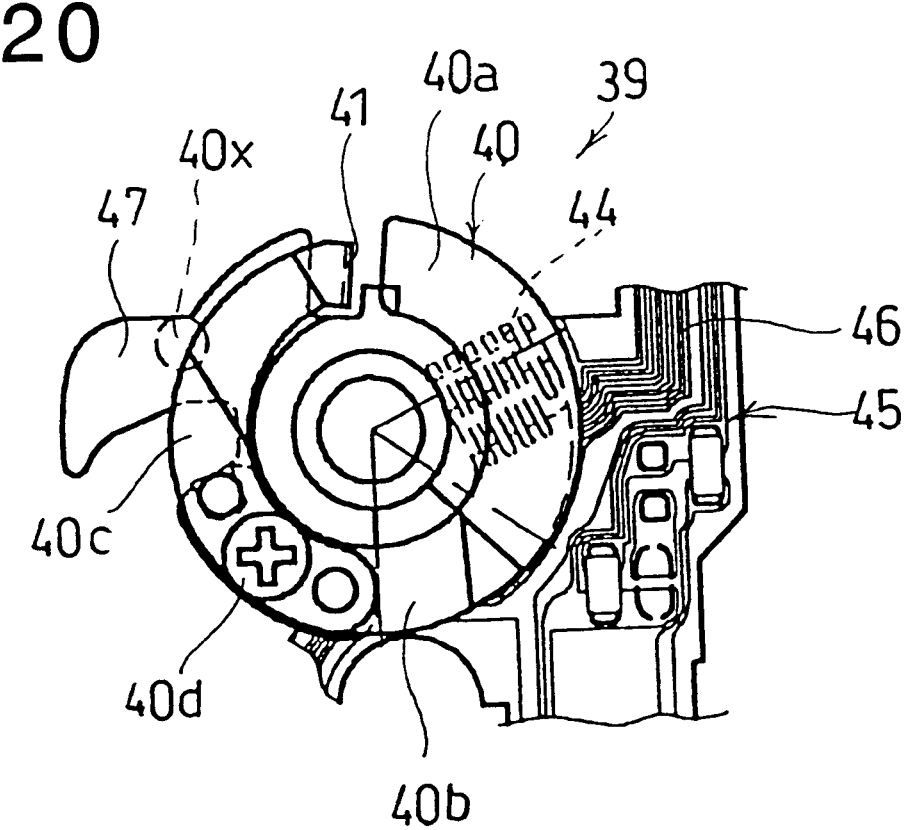
FIG. 20 is a plan view of a detection substrate and an association rotation plate.

In this state, the contact pieces 44 are moved to the position "C" shown in FIG. 19 by the rotation of the association rotation plate 40. In the position "C", the second contact 45c is connected to the land portion 45a, in addition to the first contact 45b. Thus, it is detected that the power source is ON and the panoramic size switch is ON.

The angular positions of the common operation dial 16 shown in FIG. 5 (FIG. 6), FIG. 7 (FIG. 8) and FIG. 9 (FIG. 10) correspond to the power-OFF position, the standard picture size position and the panoramic size position, respectively. Thus, the ON/OFF operation of the power source and the driving of the picture size switching mechanism can be carried out by the common operation dial 16. Note that the rear cover 12 is provided with mark (indicias) 12a (FIG. 1) corresponding to the angular positions of the operation knob 16a, so that an operator can visually confirm the operation state by the common operation dial 16.

The operation of the common operation dial 16 when it is rotated in the reverse direction will be discussed below.

When the common operation dial 16 is rotated from the panoramic size position (FIGS. 9 and 10) to the standard size position (FIGS. 7 and 8), the association rotation plate 40 is rotated to the angular position shown in FIG. 22 due to the biasing force of the biasing spring 43, so that the pressure exerted on the follower pin 51 by the panoramic size operation cam 47 is released. Consequently, the first and second light interception frames 50 and 60 are slid in opposite directions to a position in which the upper light interception portion 53 and the lower light interception frame 62 are retracted out of the aperture 70a, so that the picture plane is determined by the aperture 70a. In this state, the contact pieces 44 of the association rotation plate 40 only connect the land portion 45a to the first contact 45b so that electrical supply necessary for the panoramic photographing function cannot be given.

When further rotation of the common operation dial 16 toward the power-OFF position (FIGS. 5 and 6) occurs, the association lever 20 is disengaged from the upright wall portion 41, and hence the pressure on the upright wall portion 41 by the insertion projection 20a of the association lever 20 is removed. As a result, the association rotation plate 40 is rotated to an angular position (FIG. 21) in which the contact pieces 44 are connected only to the land portion 45a. Thus, the power source of the camera is turned OFF. Note that since the disengagement position of the panoramic size operation cam 47 from the follower pin 51 is moved, the picture size switching mechanism 38 is not driven in the rotation of the association rotation plate 40.

In the camera, the size of the field frame which can be viewed through the view window 17 of the finder can be varied in accordance with the change in the picture plane size. The variation of the field frame size can be carried out electrically or mechanically, as will be discussed below.

For instance, a liquid crystal display (LCD) can be provided in the vicinity of the primary image forming surface of the finder optical system, so that the LCD can be controlled in accordance with the input operation of the switch mechanism 39. Namely, when the common operation dial 16 is located in the power-OFF position at the standard picture size (i.e., when the contact pieces 44 of the association rotation plate 40 are connected only to the land portion 45a, or to the land portion 45a and the first contact 45b) the LCD is made transparent to form a field frame corresponding to the standard picture size. When the common operation dial 16 is rotated to the panoramic size position, so that the contact pieces 44 are connected also to the second contact 45c, the voltage to be applied is controlled so that the liquid crystal material of the portion of the LCD that corresponds to the panoramic field frame is made opaque, and consequently a panoramic size of the finder field frame is obtained.

Figure 24:
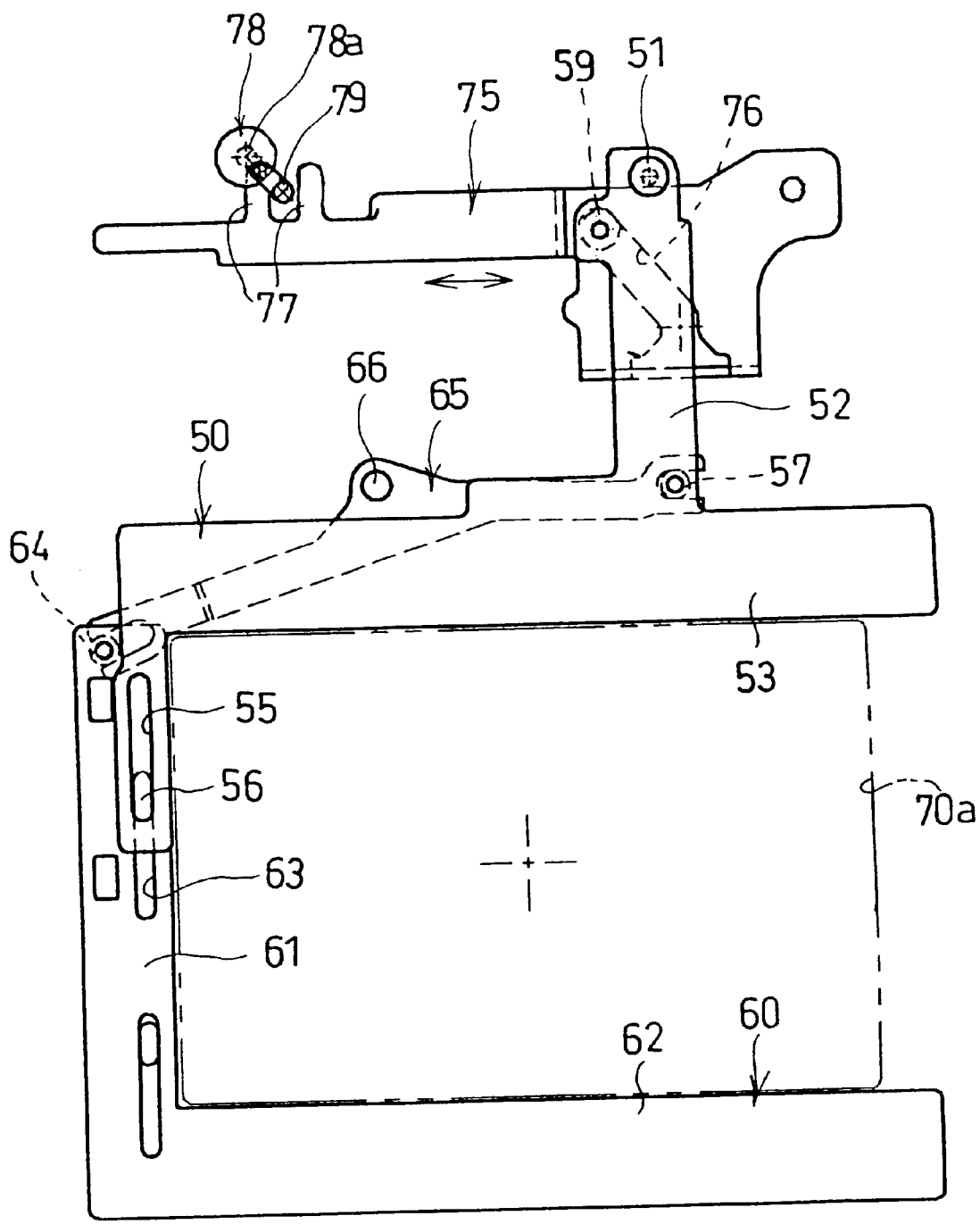
FIG. 24 is a schematic view of light interception frames and a field frame drive mechanism at a standard picture size.
Figure 25:
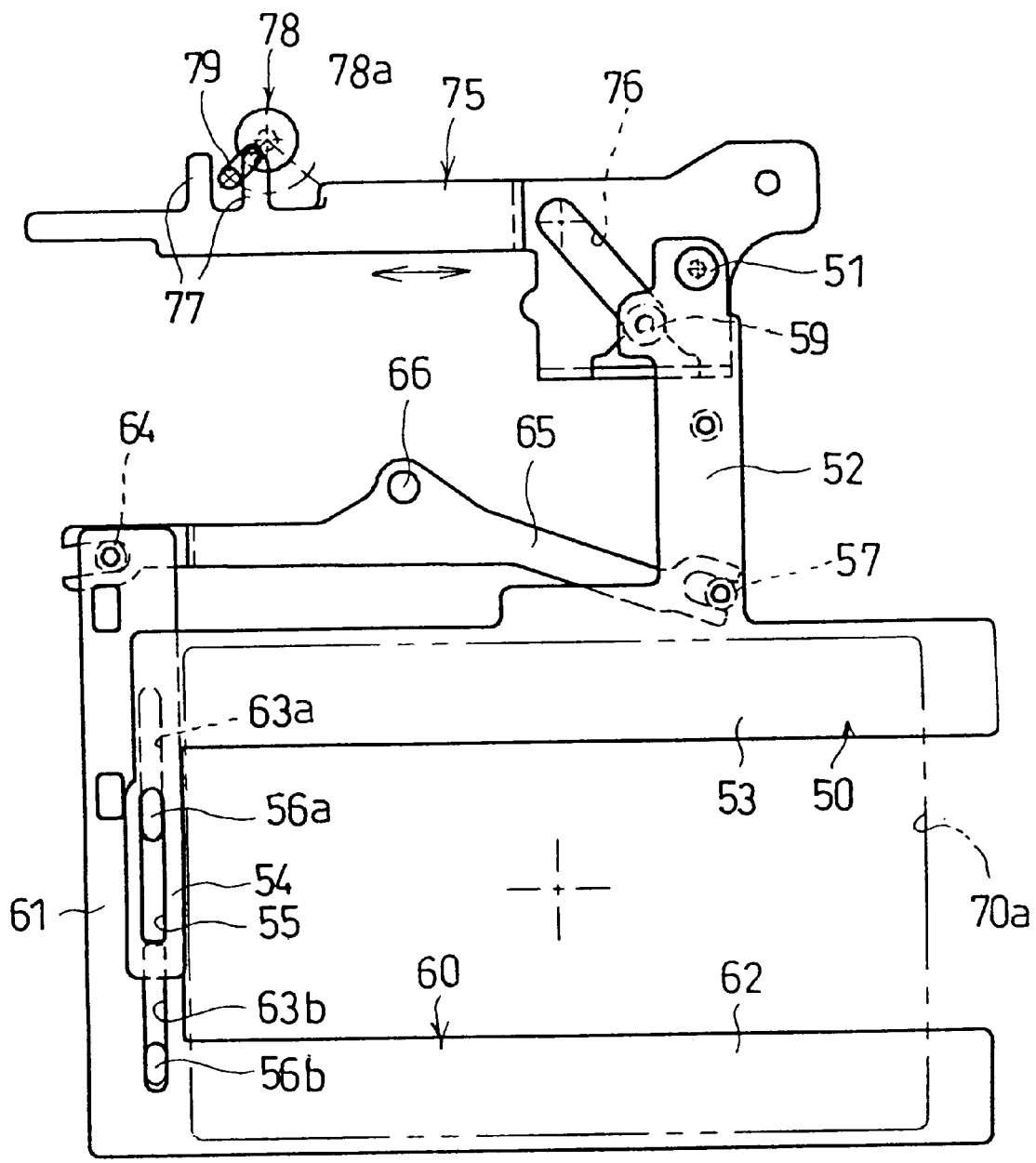
FIG. 25 is a schematic view of light interception frames and a field frame drive mechanism at a panoramic picture size.

FIGS. 24 and 25 show the mechanical association with the switching operation of the finder field frame. The picture size switching mechanism 38 forms the standard picture size defined by the aperture 70a in FIG. 24 and forms the panoramic size in FIG. 25. The first light interception frame 50 is provided with a field frame association pin 59 which extends in the same direction as the association pin 57. The body 11a supports a field frame association lever 75 which is movable in a direction parallel with the major sides of the aperture 70a. The field frame association pin 59 of the first light interception frame 50 is slidably fitted in an oblique hole 76 formed in the field frame association lever 75 and inclined with respect to the direction of the movement of the field frame association lever 75.

The field frame association lever 75 is equipped with a pair of holding arms 77 extending in a direction perpendicular to the direction of the movement thereof. The holding arms 77 hold therebetween an eccentric pin 79 of the field frame drive member 78. The field frame drive member 78 is rotatable about the shaft portion 78a. The eccentric pin 79 is located eccentric from the shaft portion 78a. There is a field frame size switching member (not shown) in the vicinity of the primary image forming surface of the finder optical system, so that the size of the field frame can be switched between a standard size corresponding to the standard picture size and a panoramic size corresponding to the panoramic picture size in accordance with the rotation of the field frame drive member 78.

As can be seen in FIG. 24, when the picture size switching mechanism 38 defines the standard size, the field frame association pin 59 abuts against the upper end of the oblique hole 76. In this position, the field frame association lever 75 holds the field frame drive member 78 in a field frame forming position corresponding to the standard picture size through the eccentric pin 79. When the picture size switching mechanism 38 is moved to the panoramic size position shown in FIG. 25, the field frame association lever 75 is moved in the left direction in accordance with the relationship between the field frame association pin 59 and the oblique hole 76. Consequently, the field frame drive member 78 whose eccentric pin 79 is held between the holding arms 77 is rotated about the shaft portion 78a. Thus, the field frame size switching member within the finder optical system is driven to intercept the upper and lower edges of the standard field frame to thereby obtain a field frame corresponding to the panoramic size. Therefore, the finder field frame corresponding to the picture size which changes can be formed in accordance with the rotation of the common operation dial 16.

The above-mentioned operation of each member or mechanism can only occur when the rear cover 12 is closed. When the rear cover 12 is open, the insertion projection 20a of the association lever 20 is disengaged from the association lever guide hole 36. Consequently, the association rotation plate 40 is returned to the power-OFF position shown in FIG. 21 due to the biasing force of the association plate biasing spring 43. If the picture size switching mechanism 38 forms the panoramic size picture frame, the first and second light interception frames 50 and 60 are returned to the retracted position in which they are out of the aperture 70a, due to the spring force of the light interception frame biasing spring 69. Since the common operation dial 16 is provided on the rear cover 12, the click spring 21 which determines the angular position thereof is disengaged from the click projections 31 through 34 on the camera body 11 when the rear cover 12 is open. As a result, the common operation dial 16 is returned to the angular position corresponding to the power-OFF position (FIGS. 5, 6) due to the biasing force of the dial biasing spring 26. Therefore, when the rear cover 12 is open, the power source of the camera is always turned OFF, regardless of the angular position of the common operation dial 16. The first and second light interception frames 50 and 60 are held in the retracted position (standard size) in which they are located out of the aperture 70a. Therefore, it is possible to prevent a malfunction (such as the shutter releasing operation) occurring while the rear cover 12 is open. Moreover, there is no possibility of the user (photographer) touching the light interception frame (while the rear cover 12 is open) corresponding to the panoramic size which could result in a breakage thereof.

When the rear cover 12 is closed (after being opened), the angular positions of the common operation dial 16 and the association rotation plate 40 correspond to the power-OFF position, and hence there is no danger of the association lever 20 interfering with other members without adjusting the respective angular positions, thus resulting in a smooth closure of the rear cover.

As can be understood from the foregoing, in the camera of the present invention, since the picture size switching mechanism and the power source switching mechanism are actuated by the common operation dial 16, the operation system of the camera is simplified. In case of a water-proof/drip-proof camera to which the illustrated embodiment is applied, if the operation member which is exposed to the outside is commonly used, the number of the portions which are to be sealed can be reduced.

The common operation dial 16 is provided on the rear cover 12 and the picture size switching mechanism 38 and the switch mechanism 39 are provided in the camera body 11, in the illustrated embodiment, as mentioned above. Since the common operation dial 16 and the association rotation plate 40 are biased toward the angular positions corresponding to the power-OFF position (standard picture size position), the association therebetween is maintained if the rear cover 12 is opened.

Although the picture size switching operation member and the member to be actuated thereby are provided on the rear cover and in the camera body in the illustrated embodiment, it is possible to provide the common operation member on the camera body, for the purpose of simplification of the operation system due to the common use of the operation member. In this modification, the common operation dial 16 is directly connected to the association rotation plate 40.

Although in the illustrated embodiment, the members to be actuated on the camera body side are the picture size switching mechanism 38 and the power source switch mechanism 39, the electrical signal generation device and the mechanical device actuated by the common operation member can be those other than the picture size switching mechanism and the power source switch mechanism in view of the simplification of the operation system due to the common use of the operation member. For example, it is possible to electrically input a switching signal for the photographing mode (e.g., ON/OFF signal for the strobe), without using the power source switch, in the electrical signal generation device. Also, the mechanical operation device can be, for example, an unlocking mechanism which unlocks the rear cover or the lid for the battery compartment in place of the picture size switching mechanism.

An embodiment of a picture size switching mechanism in which no biasing member for biasing the light interception frames is necessary will be discussed below with reference to FIGS. 26(A,B) through 31. In this embodiment, explanation of the elements corresponding to those in FIGS. 1 through 25 will be given.

Figure 26A:
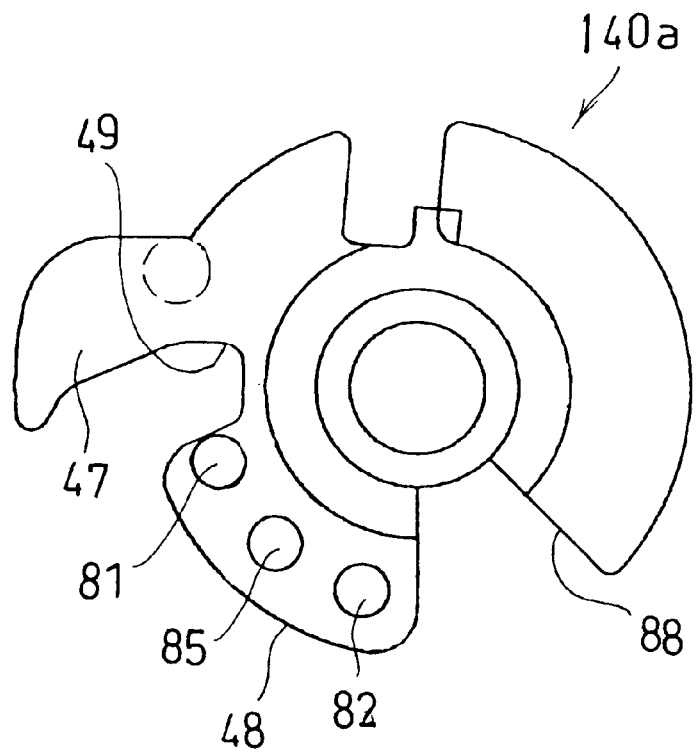
FIG. 26A is an exploded plan view of a cam plate of an association rotation plate, in an embodiment in which a light interception member is driven by a cam mechanism.
Figure 26B:
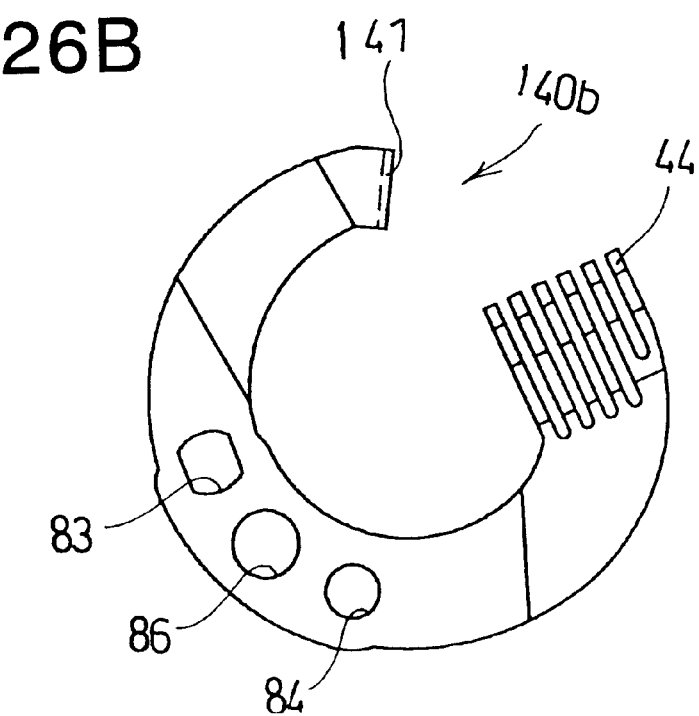
FIG. 26B is an exploded plan view of a contact plate of an association rotation plate, in an embodiment in which a light interception member is driven by a cam mechanism.
Figure 27:
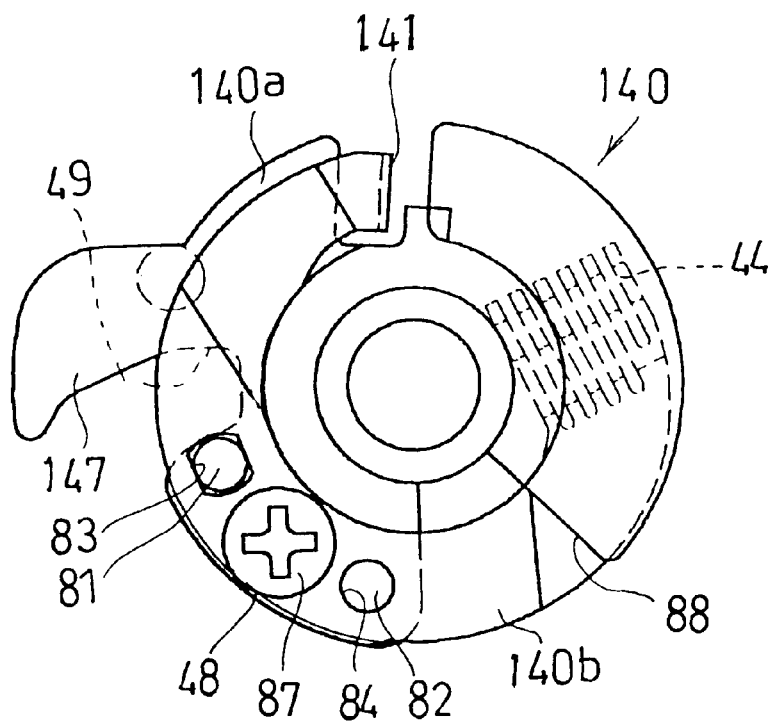
FIG. 27 is a plan view of an assembly of an association rotation plate consisting of a cam plate and a contact plate, shown in FIGS. 26A and 26B.

As shown in FIGS. 26A and 26B, the association rotation plate 140 is provided with a cam plate 140a (rotation cam member) and a contact plate 140b. The cam plate 140a is provided with a pair of positioning projections 81 and 82, and the contact plate 140b is provided with a pair of positioning holes 83 and 84. The positioning projections 81 and 82 are inserted in the corresponding positioning holes 83 and 84. The cam plate 140a and the contact plate 140b are secured to each other by a screw 87 which is screwed in threaded holes 85 and 86 formed in the cam plate 140a and the contact plate 140b, respectively. The cam plate 140a is provided with a radial cut-away portion 88. The contact plate 140b is made of an electrically conductive material. The contact plate 140b are located at opposite ends thereof on the front and rear sides of the cam plate 140a through the cut-away portion 88.

Figure 28:
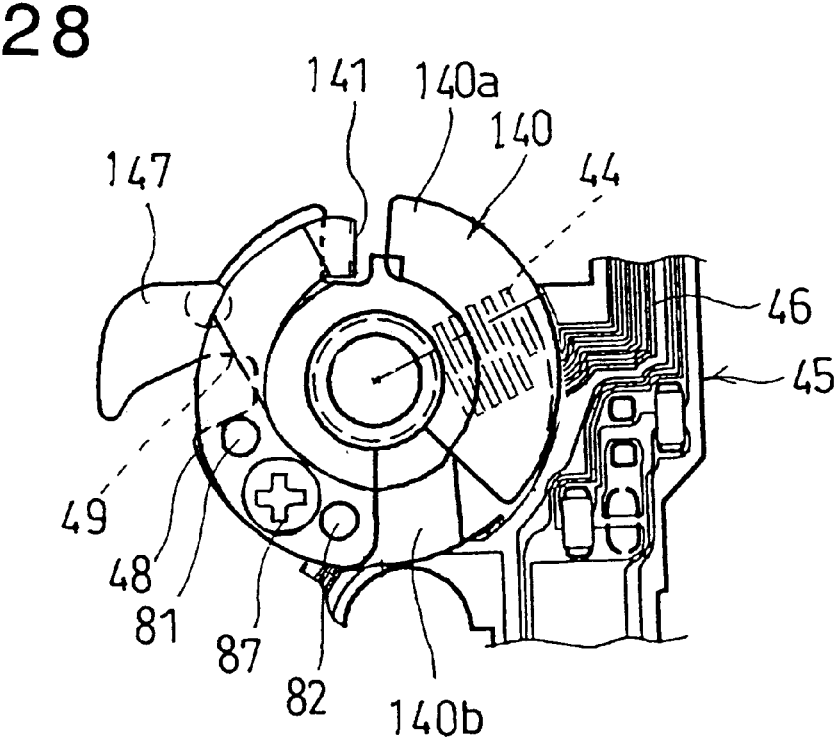
FIG. 28 is a plan view of a detection substrate and a association rotation plate shown in FIG. 27.

The one end of the contact plate 140b located on the front side of the cam plate 140a (front side of the sheet of the drawing of FIG. 27) is provided with an upright wall portion 141 extending in a direction perpendicular to the direction of rotation of the association rotation plate 140. The upright wall portion 141 can be engaged by the insertion projection 20a of the association lever 20 inserted in the association lever guide hole 36. The other end of the contact plate 140b opposed to the body 11a (rear side of the sheet of the drawing of FIG. 27) is provided with contact pieces 44. The contact pieces 44 are in sliding contact with the detection substrate 45 provided in the body 11a in accordance with the association rotation plate 140 (FIG. 28).

The cam plate 140a of the association rotation plate 140 is provided with a panoramic size operation cam 147 which extends in the radial direction, and a standard picture plane holding cam (first cam surface) 48 at a position different from the operation cam 147. The standard picture plane holding cam 48 defines a curved cam surface, the center of curvature thereof being at the center of rotation of the association rotation plate 140.

The panoramic size operation cam 147 is provided with a cam surface (second cam surface) 49 opposed to the standard picture plane holding cam 48. The follower pin 51 of the first light interception frame 50 is located to engage with the cam surface 49 of the panoramic size operation cam 147 and the standard picture plane holding cam 48. Note that in this embodiment, a biasing member corresponding to the light interception frame biasing spring 69 is not provided in the picture size switching mechanism, unlike the embodiment shown in FIGS. 21 through 23.

The operation of the picture size switching mechanism will be discussed below with reference to FIGS. 29 through 31. For clarity, the association rotation plate 140 is represented only by the cam plate 140a to clearly show the abutment of the cam against the follower pin 51 in FIGS. 29 through 31, but the cam plate 140a and the contact plate 140b integrally rotate.

Figure 29:
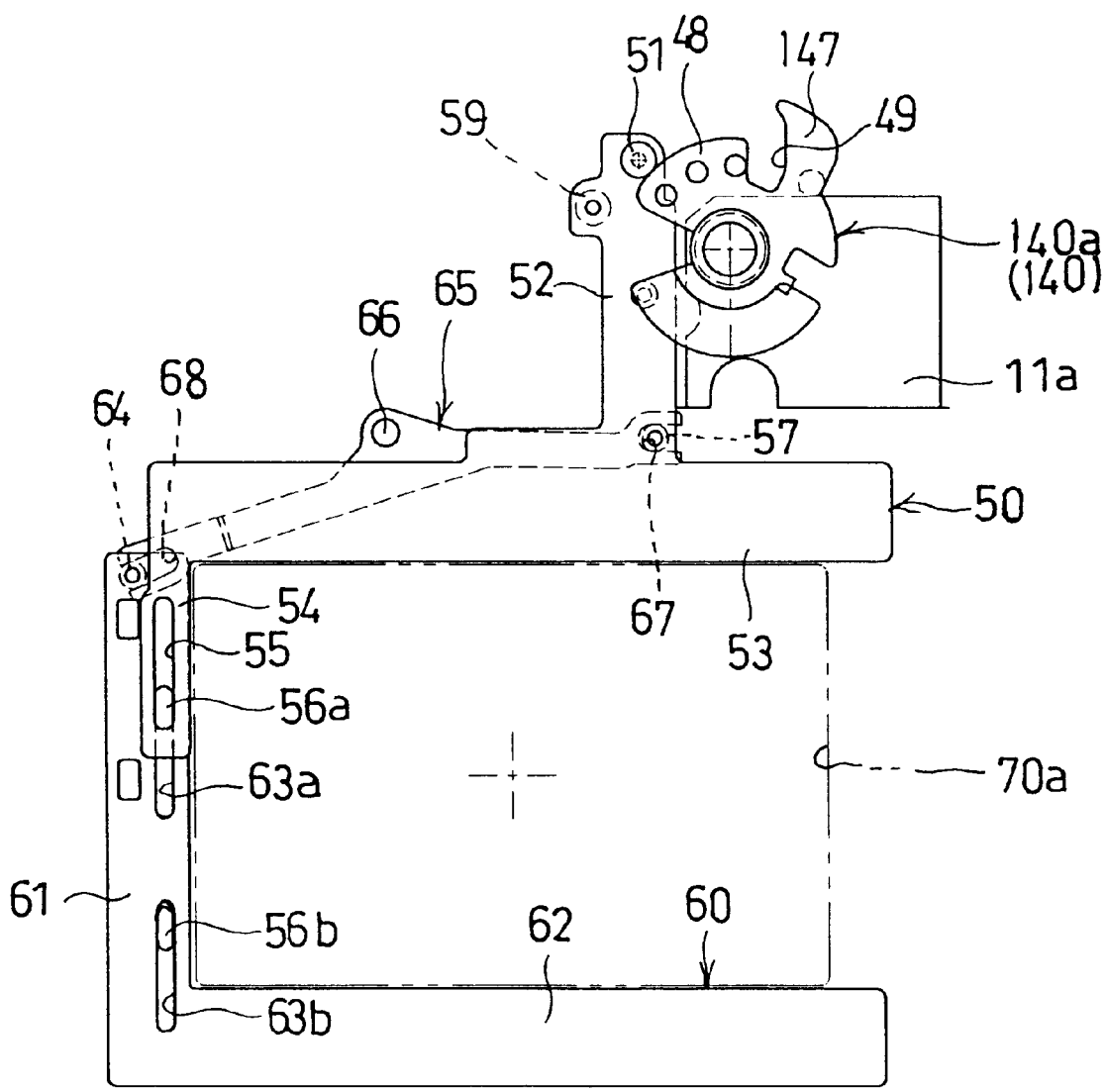
FIG. 29 is a schematic view of an association rotation plate and a picture size switching mechanism in a power OFF position and at a standard picture size, in an embodiment in which a light interception member is driven by a cam mechanism.

In the angular position of the common operation dial 16 shown in FIGS. 5 and 6 (i.e., in the power-OFF position), the association lever 20 does not engage with the upright wall portion 141, so that the association rotation plate 140 is biased by the biasing spring 43 (not shown in FIGS. 29 through 31) and held in the angular position shown in FIG. 29. In this state, the standard picture plane holding cam 48 of the association rotation plate 140 engages with the follower pin 51 from the lower side, so that the first light interception frame 50 is held in the upper position in which the upper light interception portion 53 is retracted out of the aperture 70a and the second light interception frame 60 which is associated with the first light interception frame 50 through the association lever 65 is held in the lower position in which the lower light interception portion 62 is retracted out of the aperture 70a, respectively. Consequently, the standard picture size is determined by the aperture 70a. Note that a further upward movement of the first light interception frame 50 beyond the upper position shown in FIG. 29 is restricted and a further downward movement of the second light interception frame 60 beyond the lower position shown in FIG. 29 is restricted. Furthermore, the first and second light interception frames 50 and 60 are firmly held in the upper and lower positions so as not to accidentally move.

Figure 30:
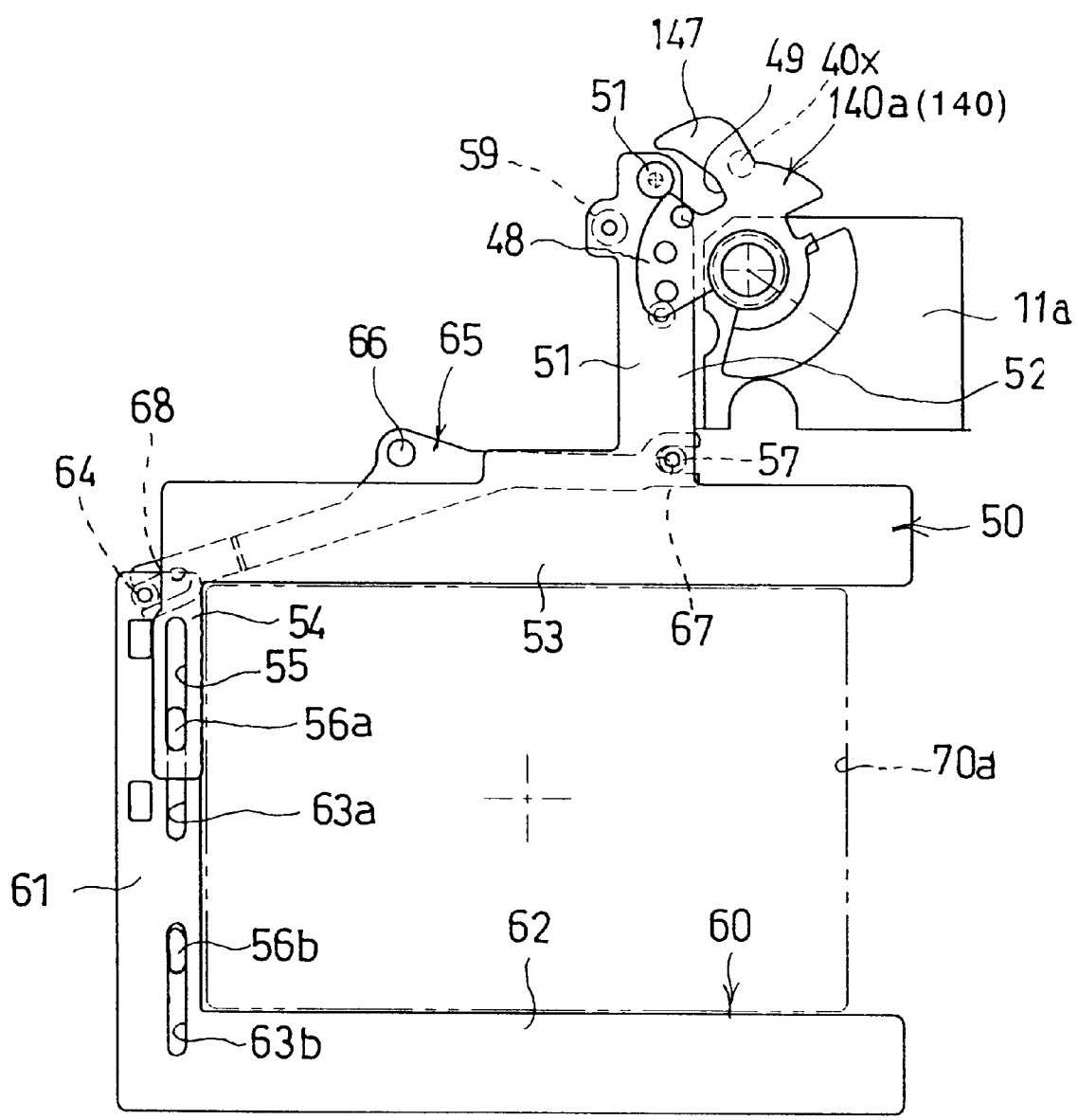
FIG. 30 is a schematic view of an association rotation plate and a picture size switching mechanism in a power ON position and at a standard picture size, in an embodiment in which a light interception member is driven by a cam mechanism.
Figure 31:
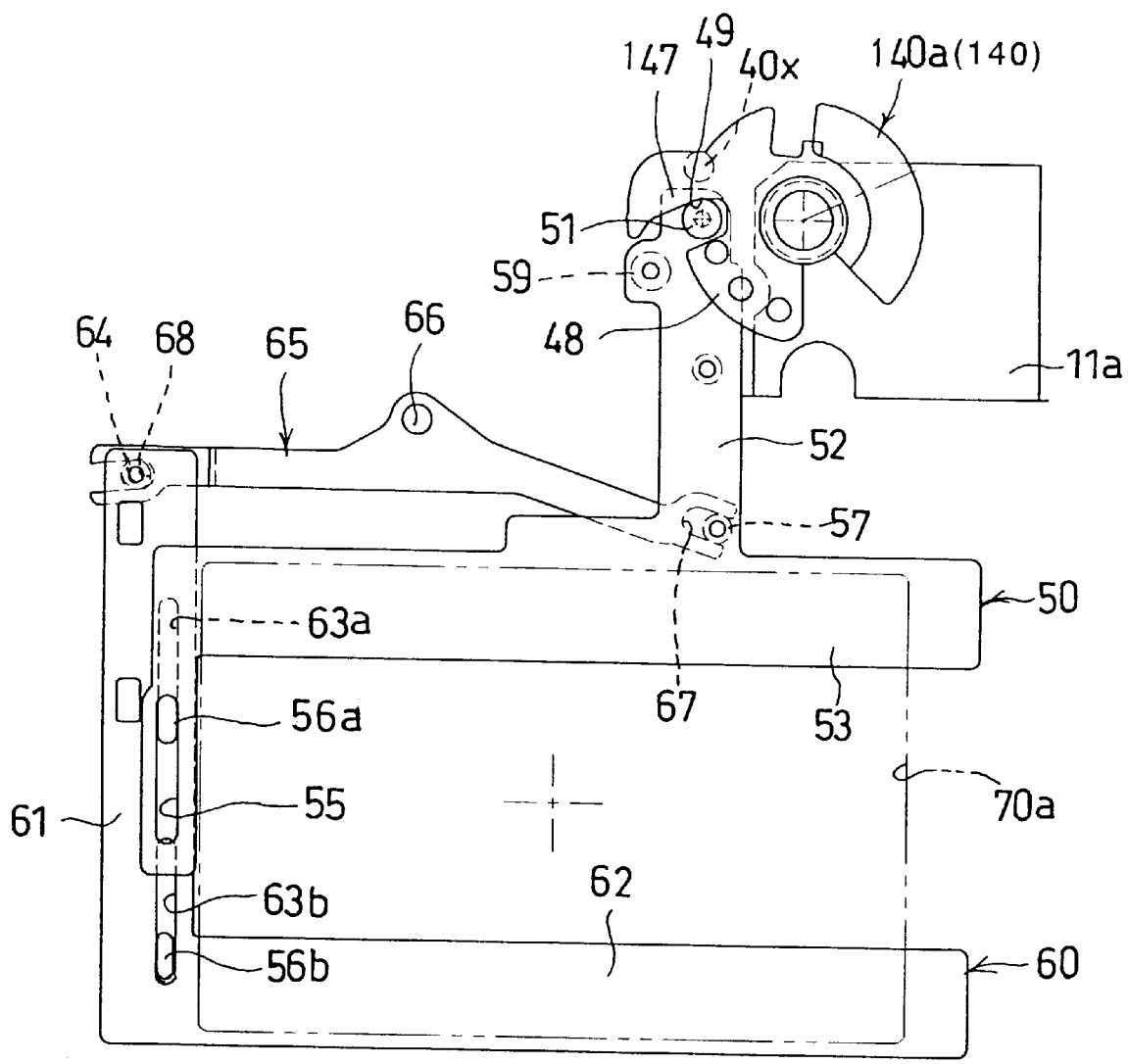
FIG. 31 is a schematic view of an association rotation plate and a picture size switching mechanism in a power ON position and at a panoramic picture size, in an embodiment in which a light interception member is driven by a cam mechanism.

When the common operation dial 16 is rotated to the click position shown in FIGS. 7 and 8, the upright wall portion 141 is pressed by the association lever 20 to thereby rotate the association rotation plate 140 to the position shown in FIG. 30. In this position, the contact pieces 44 connect the land portion 45a and the first contact 45b, so that the power source of the camera is turned ON. At this angular position of the association rotation plate 140, since the standard picture plane holding cam 48 engages with the follower pin 51, the first and second light interception frames 50 and 60 are located out of the aperture 70a. Consequently, the standard size picture plane is defined by the aperture 70a. Since the standard picture plane holding cam 48 defines a cam surface in the form of an arc coaxial to the association rotation plate 40, the abutment position between the cam 48 and the follower pin 51 does not change, so that the standard picture plane can be maintained, regardless of the angular position of the association rotation plate 40.

When the common operation dial 16 is rotated to the click position shown in FIGS. 9 and 10, the association rotation plate 140 is further rotated through the association lever 20. Consequently, the standard picture plane holding cam 48 is moved away from the follower pin 51, so that the first light interception frame 50 can be moved in the direction to move the upper light interception portion 53 into the aperture 70a. When the cam surface 49 of the panoramic size operation cam 147 engages with the follower pin 51 from the upper side to move the same, the first light interception frame 50 is moved downward to move the upper light interception portion 53 into the aperture 70a. At the same time, the second light interception frame 60 is translated in the direction opposite to the first light interception frame 50 in accordance with the swing movement of the association lever 65, and consequently, the lower light interception portion 62 is moved into the aperture 70a. Thus, the panoramic size picture plane is defined in which the upper and lower edges of the standard picture plane are obstructed by the upper and lower light interception portions 53 and 62. Note that a further downward movement of the first light interception frame 50 beyond the lower position shown in FIG. 31 is restricted and a further upward movement of the second light interception frame 60 beyond the upper position shown in FIG. 31 is restricted. The first and second light interception frames 50 and 60 are firmly held in the lower and upper positions so as not to accidentally move.

When the common operation dial 16 is rotated from the panoramic size position (FIGS. 9, 10) to the standard size position (FIGS. 7, 8), the association rotation plate 140 is rotated to the position shown in FIG. 30 due to the biasing spring force of the biasing spring 43, so that the pressure on the follower pin 51 by the cam surface 49 of the panoramic size operation cam 147 is released. The standard picture plane holding cam 48 engages with the follower pin 51 and move the same from the lower side. Consequently, the first and second light interception frames 50 and 60 are slid in opposite directions to move the upper and lower light interception portions 53 and 62 out of the aperture 70*a* due to the rotational force of the association rotation plate 140. Thus, the picture plane is defined by the aperture 70*a*. The contact pieces 44 of the association rotation plate 140 connect the land portion 45*a* to the first contact 45*b* only, so that no electrical signal for the panoramic photographing is provided.

When the common operation dial 16 is rotated to the power-OFF position shown in FIGS. 5 and 6, the insertion projection 20*a* of the association lever 20 is disengaged from the upright wall portion 141 and hence the association rotation plate 140 is rotated to the angular position in which the contact pieces 44 are connected only to the land portion 45*a* by the association plate biasing spring 43. Thus, the power source of the camera is turned OFF. Since the standard picture plane holding cam 48 continues engaging with the follower pin 51 during the rotation of the association rotation plate 140, the first and second light interception frames 50 and 60 are held in the respective same positions.

As can be understood from the above discussion, since the rotary cam member rotatably supported in the vicinity of the light interception frame is provided with a cam for the standard picture plane and a cam for the panoramic size picture plane, so that the picture size can be switched in accordance with the rotation of the rotary cam member, a biasing member is not necessary for returning the light interception frame at a predetermined position. This simplifies the structure of the picture size switching mechanism. Moreover, since the light interception frames are pressed by the cam, the light interception frames can be firmly held so as not to accidentally move. Note that since the modified embodiment is aimed at a simplification of the picture size switching mechanism, it is not always necessary to make the rotary cam member (association rotation plate 140) integral with the member (contact pieces 44) for turning the power switch of the camera, in view of the simplification, in the modified embodiment.

When the rear cover 12 is opened, the power source of the camera is always OFF, and the picture size is returned to the standard size, regardless of the angular position of the common operation dial 16. Namely, when the rear cover 12 is opened so that the insertion projection 20*a* of the association lever 20 is disengaged from the guide hole 36, the association rotation plate 140 is returned to the angular position corresponding to the power-OFF position due to the biasing force of the association plate biasing spring 43. In this state, since the association rotation plate 140 is returned to a position in which the standard picture plane holding cam 48 engages with the follower pin 51, the first and second light interception frames 50 and 60 are held in the retracted position in which they are located out of the aperture 70*a*. Consequently, when the rear cover 12 is opened, the power source is turned OFF and the standard picture plane is obtained. Also, the common operation dial 16 on the rear cover 12 is returned to an angular position (FIGS. 5, 6) corresponding thereto, due to the biasing force of the biasing spring 26. Therefore, when the rear cover 12 is closed again, it is not necessary to take a possible phase difference therebetween into account.

The following discussion will be addressed to a variable picture size camera in which a forced operation such as a closure of the rear cover while holding the operation member (common operation dial 16) at a position different from the biasing position can be carried out. A duplicate explanation for the elements corresponding to those in FIGS. 1 through 25 will not be given.

Figure 32A:
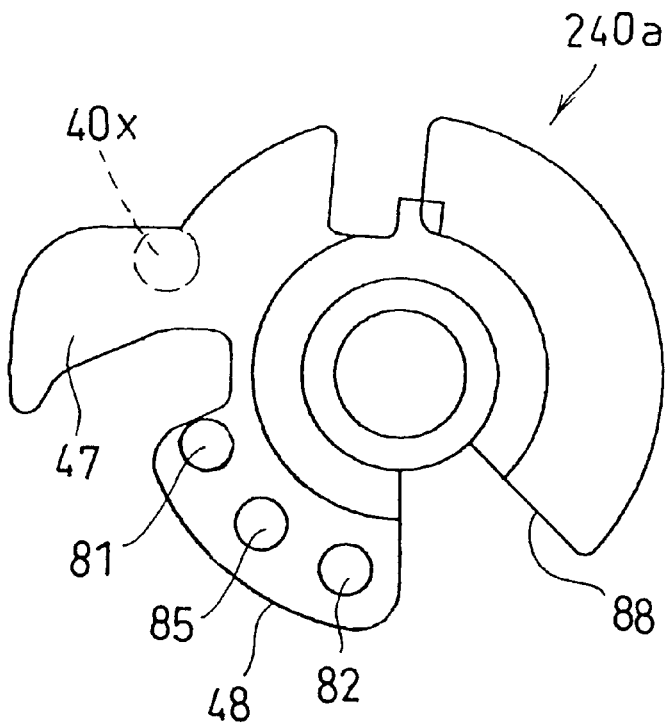
FIG. 32A is an exploded plan view of a cam plate of an association rotation plate, in an embodiment in which problems with a forced operation of an operation member are eliminated.
Figure 32B:
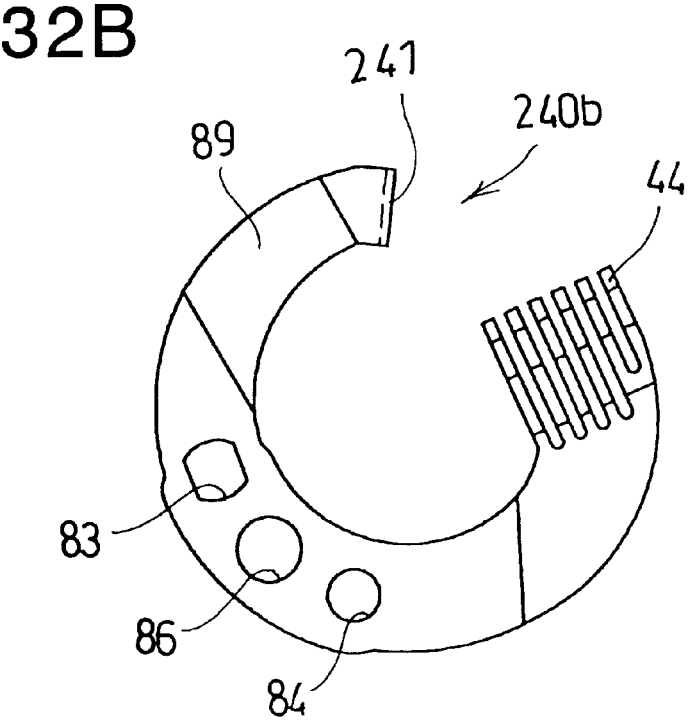
FIG. 32B is an exploded plan view of a contact plate of an association rotation plate, in an embodiment in which problems with a forced operation of an operation member are eliminated.
Figure 33:
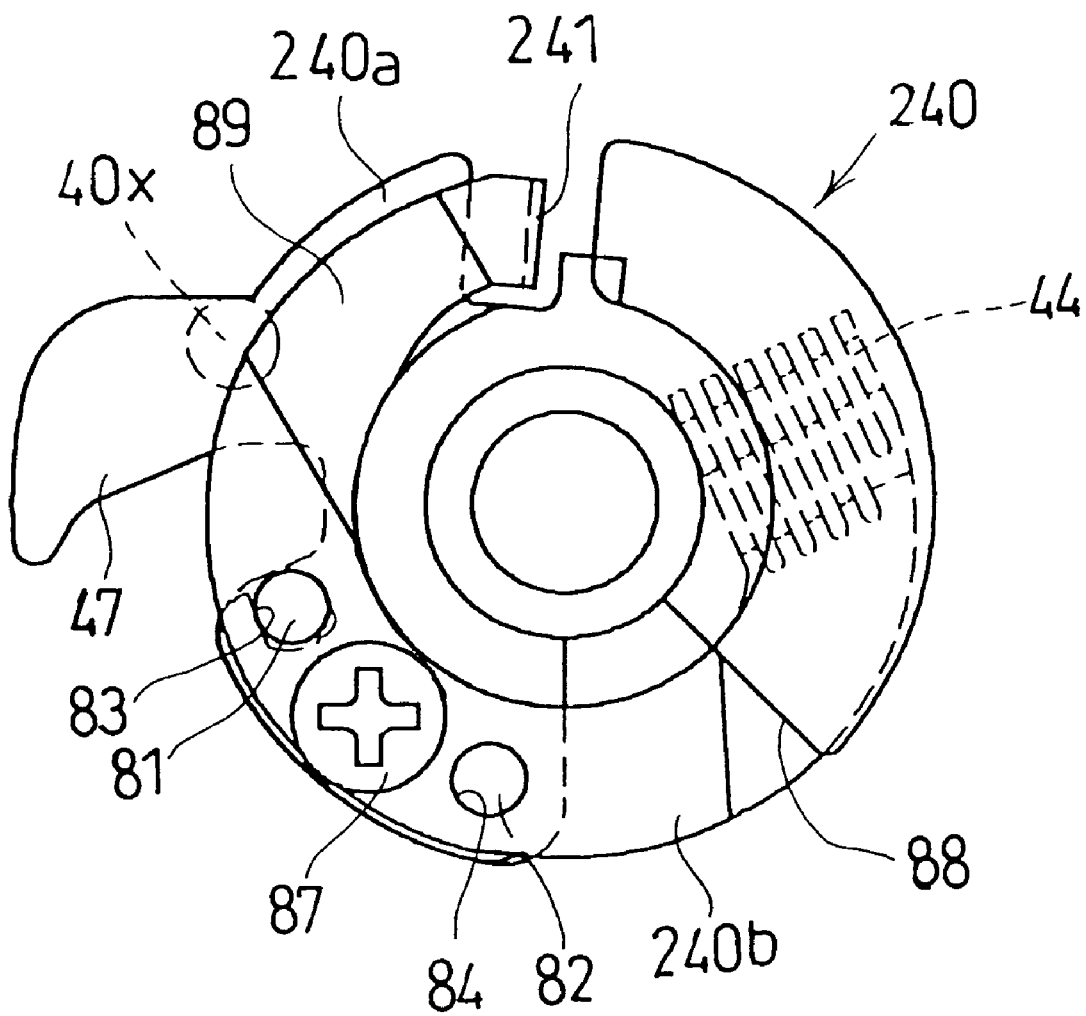
FIG. 33 is a plan view of an assembly of an association rotation plate consisting of a cam plate and a contact plate, shown in FIGS. 32A and 32B.

Looking at FIGS. 32A, 32B and 33, the association rotation plate 240 is composed of the cam plate 240*a* and the contact plate 240*b*. A pair of positioning projections 81 and 82 are inserted in a pair of positioning holes 83 and 84. The cam plate 240*a* and the contact plate 240*b* are secured to each other by the screw 87 which is screwed in the threaded holes 85 and 86. The contact plate 240*b* which is made of an electrically conductive material is located at the opposed ends thereof on the front and rear sides of the cam plate 240*a* through the cut-away portion 88 formed in the cam plate 240*a*.

The contact plate 240 which is located on the front and rear sides of the cam plate 240*a* is provided, on the side (front side of the sheet of the drawing of FIG. 40) thereof that is opposed to the rear cover 12, with an elastically deformable plate portion 89 having a free end. As may be seen in FIG. 37, the elastically deformable plate portion 89 is bent at the connection (screw 87) to the cam plate 240*a* toward the rear cover 12. The elastically deformable plate portion 89 is provided on its free end with an upright wall portion 241 which lies in a plane substantially perpendicular to the plane in which the association rotation plate 240 rotates. The elastically deformable plate portion 89 is elastically bendable or deformable in the direction substantially perpendicular to the plane of the association rotation plate 240. In the free state, the upright wall portion 241 is located closer to the rear cover 12 than the body portion of the association rotation plate 240.

Figure 37:
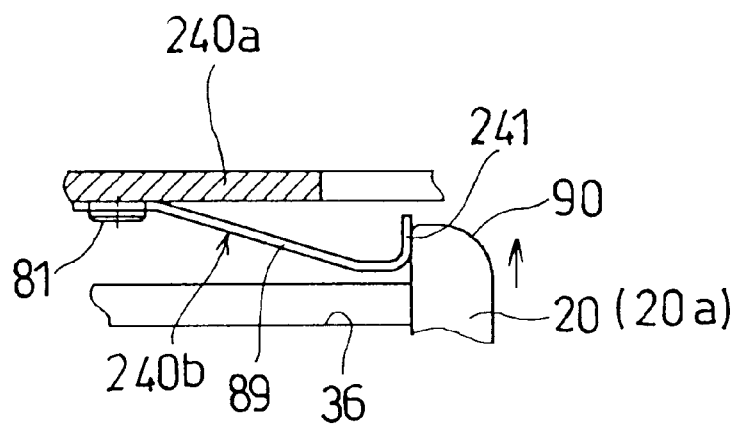
FIG. 37 is a side view of an elastically deformable plate and an insertion projection, which constitute a retraction mechanism, viewed from the direction "α" in FIG. 2.
Figure 38:
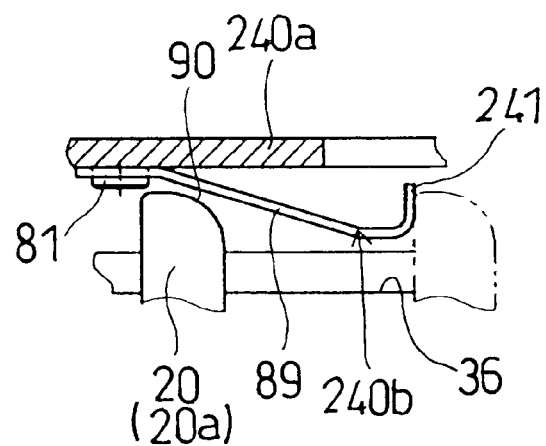
FIG. 38 is a side view of an elastically deformable plate and an insertion projection, when a rear cover is closed while a common operation dial is held in an angular position corresponding to a panoramic picture size, viewed from the same direction as FIG. 37.
Figure 39:
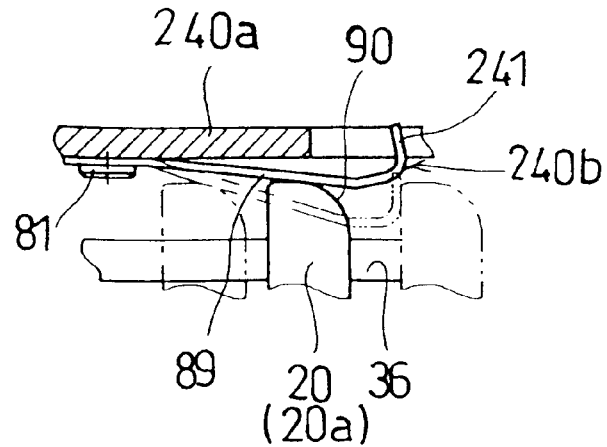
FIG. 39 is a side view of an elastically deformable plate and an insertion projection, in a power ON position, viewed from the same direction as FIG. 37.

The elastically deformable plate portion 89 can transmit the moving force applied to the upright wall portion 241 in the circumferential direction (direction parallel with the plane of the association rotation plate 240) to the association rotation plate 240 since the force is exerted on the connection to the cam plate 240*a*. Consequently, as shown in FIG. 37, when the insertion projection 20*a* of the association lever 20 engages with the upright wall portion 241, the rotation of the common operation dial 16 in the counterclockwise direction in FIG. 5 or 7 causes the insertion projection 20*a* to move the upright wall portion 241 against the association plate biasing spring 43 to thereby rotate the association rotation plate 240 in the counterclockwise direction in FIG. 34 or 35. Note that the insertion projection 20*a* of the association lever 20 is provided, on the surface thereof opposite to the surface that engages with the upright wall portion 241 of the association rotation plate 240, with an arched surface 90 at the end of the insertion projection, as can be seen in FIGS. 37 through 39.

The contact plate 240*b* is provided on the end thereof opposite to the body 11*a* with contact pieces 44 that are in sliding contact with the detection substrate 45 provided in the body 11*a*.

Figure 34:
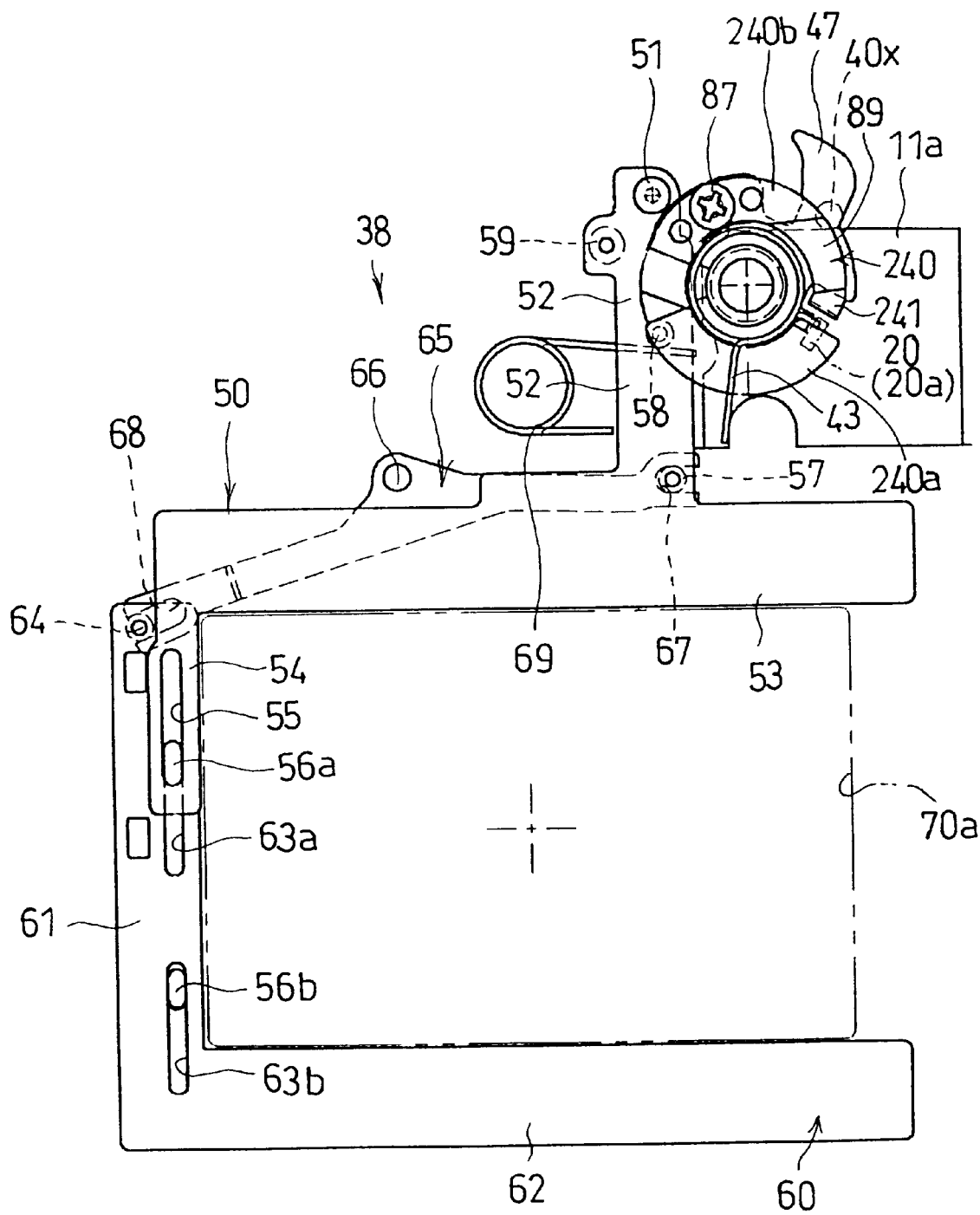
FIG. 34 is a schematic view of an association rotation plate and a picture size switching mechanism in a power OFF position and at a standard picture size, in an embodiment in which problems with a forced operation of an operation member are eliminated.
Figure 35:
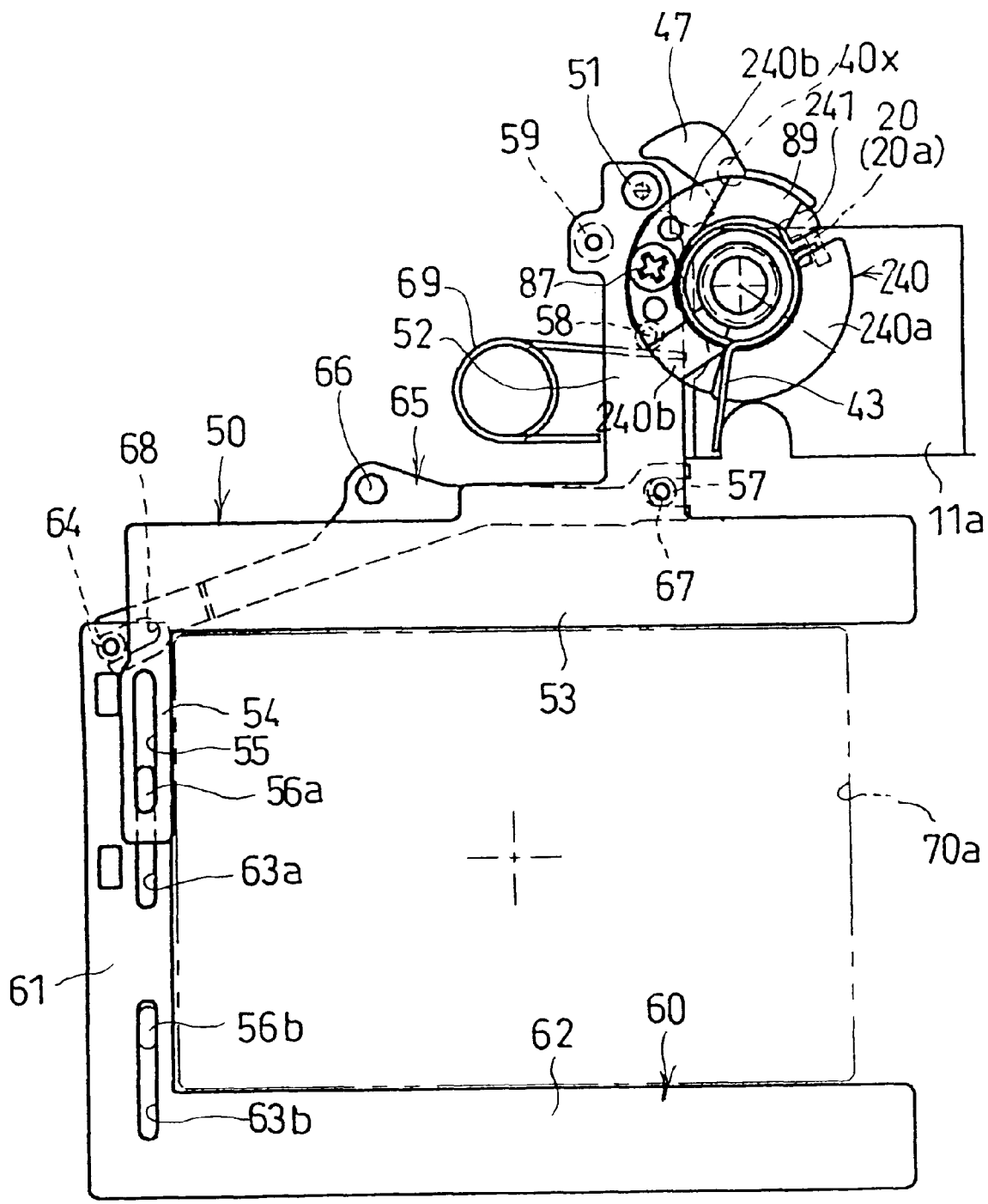
FIG. 35 is a schematic view of an association rotation plate and a picture size switching mechanism in a power ON position and at a standard picture size, in an embodiment in which problems with a forced operation are eliminated.
Figure 36:
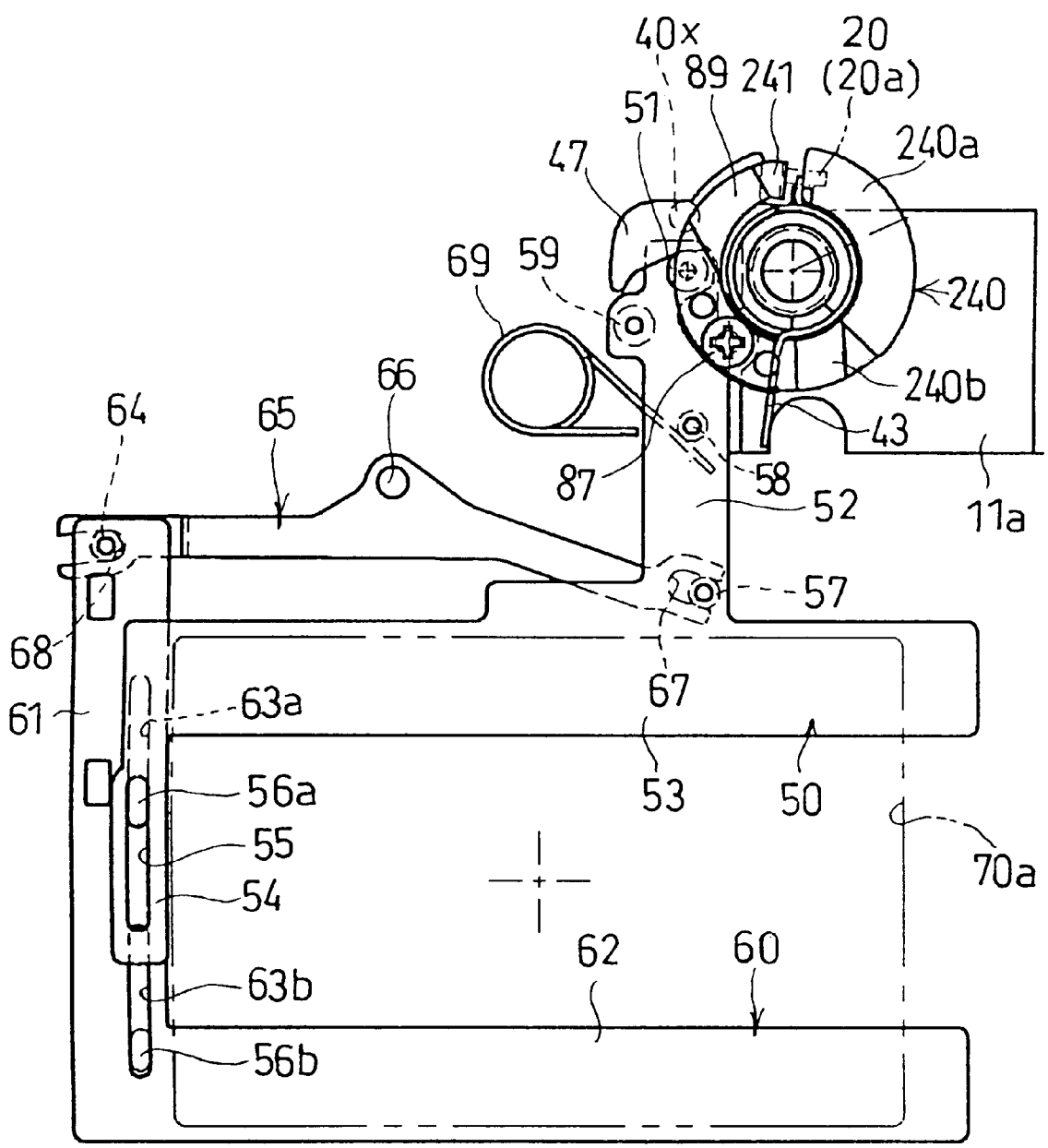
FIG. 36 is a schematic view of an association rotation plate and a picture size switching mechanism in a power ON position and at a panoramic picture size, in an embodiment in which problems with a forced operation are eliminated.

FIGS. 34 through 36 show the picture size switching mechanism upon normal operation. The operation of each element is the same as that in the previous embodiment which has been explained above with reference to FIGS. 21 through 23. Namely, FIG. 34 corresponds to the power-OFF position to which the mechanism is returned when the rear cover 12 is open. When the rear cover 12 is closed, the insertion projection 20*a* of the association lever 20 is inserted to engage with the upright wall portion 241 (FIG. 37). When the common operation dial 16 is rotated in the counterclockwise direction, the insertion projection 20*a* moves the upright wall portion 241, so that the association rotation plate 240 is rotated to the position shown in FIG. 35 to turn the power source ON at the first click position. When a further rotation of the common operation dial 16 in the counterclockwise direction occurs, the association rotation plate 240 is rotated to the position shown in FIG. 36, so that the first light interception frame 50 is moved downward through the follower pin 51 by the panoramic size operation cam 47. Consequently, the second light interception frame 60 is moved upward in association with the movement of the first light interception frame 50 to obtain the panoramic size of picture plane.

In the above-mentioned camera, when the rear cover 12 is closed (after being opened), the angular positions of the common operation dial 16 and the association rotation plate 240 are held in the power-OFF position, regardless of the previous angular positions thereof. Consequently, the association lever 20 (insertion projection 20a) does not interfere with other members without an adjustment of the angular positions, thus resulting in a smooth closure of the rear cover 12. Namely, as shown in FIG. 37, when the rear cover 12 is closed, the insertion projection 20a of the association lever 20 is inserted in the association lever guide hole 36 in the direction indicated by an arrow. Since the elastically deformable plate 89 is not located on the path of the insertion of the insertion projection 20a, the projection 20a can be inserted without interfering with the association rotation plate 240 to an insertion position in which the side surface of the insertion projection is opposed to the upright wall surface 241.

A forced operation (e.g., a closure of the rear cover which has been open while forcibly holding the common operation dial 16 in an angular position different from the angular position [FIGS. 5, 6]) corresponding to the power-OFF position will be discussed below with reference to FIGS. 38 and 39. In FIG. 38, the inserted association lever 20 when the rear cover 12 is closed while the common operation dial 16 is held in the angular position corresponding to the panoramic size position is indicated by a solid line. In this state, since the angular position of the association rotation plate 240 corresponds to the power-OFF position, the insertion projection 20a of the association lever 20 is located in the vicinity of the positioning projection 81 at a position shifted in the circumferential direction from the engagement position with the upright wall surface 241, as indicated by a two-dotted and dashed line. Note that in this insertion position, the association lever 20 does not contact with the elastically deformable plate portion 89, since the elastically deformable plate portion 89 is bent or inclined. Therefore, the rear cover 12 can be closed in spite of the forced holding of the common operation dial 16 in the angular position corresponding to the panoramic size position.

When the common operation dial 16 is rotated in the power-OFF direction, the association lever 20 is moved in the right direction in FIG. 38 so that the arc surface 90 abuts against the elastically deformable plate portion 89. Since the elastically deformable plate portion 89 is deformable in the direction substantially perpendicular to the plane of the association rotation plate 240, the portion 89 is deformed toward the cam plate 240a in accordance with the movement of the association lever 20. The association lever 20 when the common operation dial 16 is in the angular position (FIGS. 7, 8) corresponding to the power-ON position is indicated by a solid line in FIG. 39, in which the elastically deformable plate portion 89 is elastically deformed toward the cam plate 240a.

When the common operation dial 16 is further rotated to the angular position corresponding to the power-OFF position (FIGS. 5, 6), the association lever 20 passes the boundary between the bent portion and the upright wall surface 241, of the elastically deformable plate portion 89 and is returned to the normal engagement position shown in FIG. 37. Consequently, the pressure acting on the elastically deformable plate portion 89 is released, and hence the portion 89 is returned to a free state. In the return operation mentioned above, since the association lever 20 presses the elastically deformable plate portion 89 at the arc surface 90, a smooth return operation can be effected.

If the common operation dial 16 is held in the angular position (FIGS. 7, 8) corresponding to the power-ON position when the rear cover 12 which has been opened is closed, the rear cover 12 can be closed to a lock position since the elastically deformable plate 89 is pressed and deformed by the association lever 20, as shown in FIG. 39. Note that, when the rear cover 12 is open, the common operation dial 16 can be continuously rotated within the angular range in which the guide projection 25 is guided in the guide groove 24, without being click-stopped. Therefore, the position in which the insertion projection 20a is inserted when the common operation dial 16 is held in a position different from the biasing position is not limited to that shown in FIG. 38 or 39.

As can be understood from the above discussion, since the drive transmission portion which transmits the moving force of the common operation dial 16 to the association rotation plate 240 is provided with the retraction mechanism which is constituted by the elastically deformable plate portion 89 which is deformable in the direction of the insertion of the insertion projection 20a of the association lever 20; the rear cover 12 which has been opened can be closed without deforming the first and second light interception frames 50 and 60, regardless of the angular position of the common operation dial 16. If the common operation dial 16 is returned to the angular position corresponding to the power-OFF position after the rear cover 12 is closed, the above-mentioned forced operation can be carried out. Note that since the elastically deformable plate portion 89 is made integral with the contact plate 240b, no increase in manufacturing cost is incurred.

Figure 40:
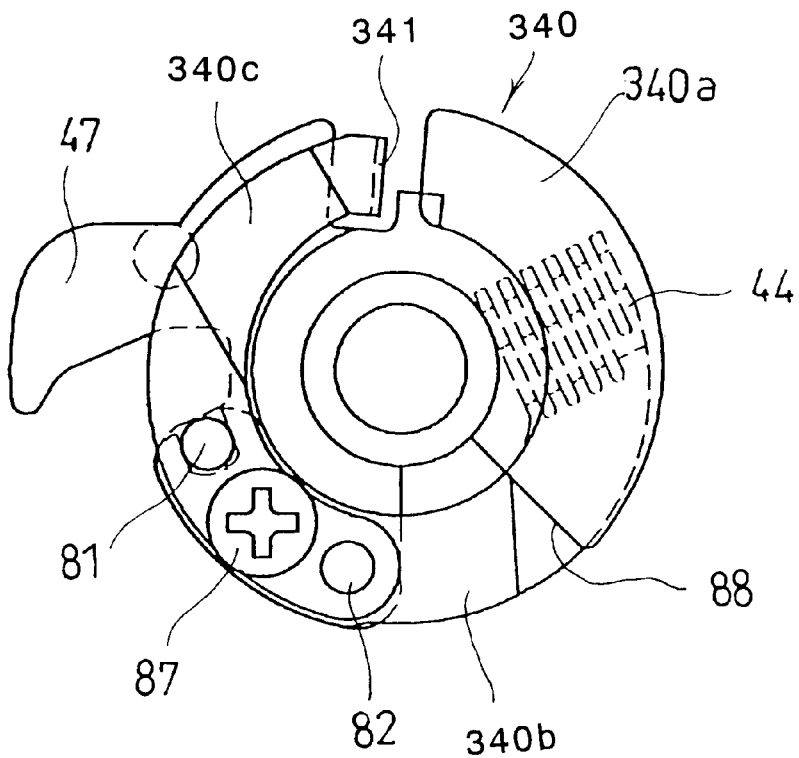
FIG. 40 is a plan view of another embodiment of an association rotation plate in an embodiment in which problems with a forced operation are eliminated.
Figure 41:
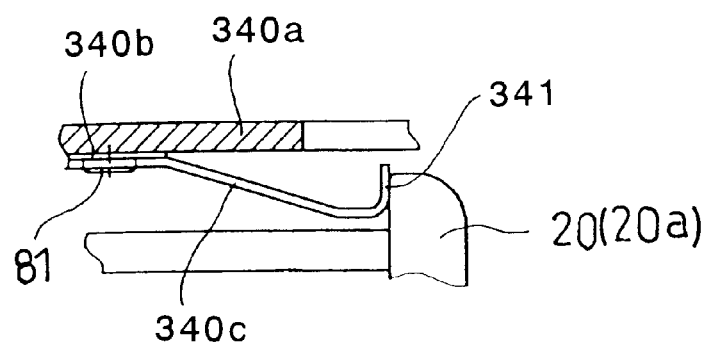
FIG. 41 is a partial sectional view of an association rotation plate shown in FIG. 40.

FIGS. 40 and 41 show the association rotation plate 340 having a retraction (deformation) mechanism similar to that for the association rotation plate 240. The association rotation plate 340 is provided with a cam plate 340a and a contact plate 340b and an elastically deformable plate 340c separate therefrom. The contact plate 340b and the elastically deformable 340c are secured to the cam plate 340a by a common screw 87. The elastically deformable plate 340c and the contact plate 340b are each provided with a pair of positioning holes corresponding to the positioning projections 81 and 82 of the cam plate 340a. The elastically deformable plate 340b and the contact plate 340c are fixed by inserting the positioning projections 81 and 82 in the corresponding positioning holes. The cam plate 340a is provided with a panoramic size operation cam 47 for switching the picture size to the panoramic size, so that the picture plane can be switched between the standard size and the panoramic size in accordance with the rotation of the association rotation plate 340. The contact plate 340b is provided with contact pieces 44 which are located on the rear side of the cam plate 340a through the cut-away portion 88 formed in the cam plate 340a. The contact pieces 44 are in sliding contact with the detection substrate provided in the camera body to turn the power source ON or OFF, etc., as mentioned before.

The elastically deformable plate 340c separate from the contact plate 340b is deformable in the direction substantially perpendicular to the plane of the association rotation plate 340 and is circumferentially bent at the positioning projection 81 in the direction away from the cam plate 340a.

The elastically deformable plate 340c is bent at its free end to define an upright wall surface portion 341 which lies in a plane substantially perpendicular to the plane in which the association rotation plate 340 rotates. The upright wall surface portion 341 can be engaged by the insertion projection 20a of the association lever 20. When the insertion projection 20a engages with the upright wall surface 341, the association rotation plate 340 is rotated in accordance with the movement of the association lever 20. The elastically deformable plate 340c is elastically deformed when pressed in the insertion direction of the association lever 20, so that the association lever 20 can be inserted. Thus, the forced operation of the operation member can be carried out without deforming the light interception frames.

In the camera according to the present invention, the forced operation, such as a closure of the rear cover while holding the operation member (common operation dial 16) in a position different from the biasing position can be effected. In connection with the forced operation, the present invention is not limited to the illustrated embodiments. Although the common operation dial 16 and the association rotation plate 240 (340) rotate about the same rotation axis in the illustrated embodiments, it is possible to linearly translate the operation member provided on the rear cover and the picture size switching mechanism which varies the picture size in association with the operation member. Moreover, although the operation member (common operation dial 16) and the picture size switching mechanism (association rotation plate 240 or 340) are adapted to turn the power source of the camera ON or OFF, the operation member and the picture size switching mechanism can be those only for varying the picture size. Furthermore, the operation mechanism within the camera body is not limited to the picture size switching mechanism. For instance, the operation mechanism provided in the camera body can be an unlocking mechanism for the rear cover, per se known. In this alternative, the lock mechanism of the rear cover is unlocked by the cam portion of the association rotation plate 240 (340) in accordance with the rotation thereof. The same advantages as those of the previous embodiments can be expected from this alternative.

As can be understood from the above discussion, according to the present invention, in a camera in which an electrical signal generation device and a mechanical operation device are provided in a camera body, and an operation member is provided on the rear cover; not only can the operation portion be simplified, but also the operation efficiency can be enhanced. Moreover, if the mechanical operation device is a picture size switching mechanism, and the electrical signal generation device is a power switch of the camera, the operation portion of a variable picture size camera can be simplified. If the picture size switching mechanism and the operation member therefor are separately provided on the camera body side and the rear cover side, high operational efficiency can be obtained. Furthermore, according to the present invention, a simple and inexpensive picture size switching mechanism can be provided in which the light interception frames can be firmly held in a predetermined position without providing a biasing member for returning the light interception frames. Moreover, according to the present invention, in a camera in which the picture size switching mechanism and the operation member therefor are separately provided on the camera body side and the rear cover side, a forced operation of the operation device upon closing the rear cover which has been opened can be carried out without burdening the operation mechanism (picture size switching mechanism). In addition to the foregoing, according to the present invention, a simple click stop mechanism can be provided in which the operation member can be stably held in a specific position and the user does not sense a substantial change in operational resistance in accordance with the operation direction or operation position.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A camera having a rear cover with an operation ember thereon, comprising:

an electrical signal generation device and a mechanical operation device, provided in a camera body;

a movable common operation member provided on said rear cover to actuate said electrical signal generation device and said mechanical operation device;

a movable association member in said camera body, which is moved in accordance with the movement of said common operation member when said rear cover is closed, to actuate both said electrical signal generation device and said mechanical operation device;

a biasing member on said rear cover, for holding said common operation member at a predetermined position when said rear cover is opened, regardless of the position of said common operation member when said rear cover has been closed; and a biasing member on said camera body, for holding said association member at a predetermined position when said rear cover is opened, regardless of the position of said association member when said rear cover has been closed.

2. A camera having a rear cover with an operation member thereon, according to claim 1, wherein said common operation member comprises a dial member which is rotatably supported by said rear cover and said association member comprises a rotary plate which is supported by said camera body to rotate about the same axis as the axis of rotation of said dial member, so that the rotary plate is rotated in accordance with the rotation of said dial member when said rear cover is closed;

said rotary plate being provided with an electrical contact portion which constitutes said electrical signal generation device, and an operation cam which actuates said mechanical operation device in accordance with the angular position of said rotary plate.

3. A camera having a rear cover with an operation member thereon, according to claim 1, wherein said electrical signal generation device comprises a power switch of said camera, and said mechanical operation device comprises a picture size switching mechanism which varies the picture plane between a standard size picture plane and a laterally elongated panoramic size picture plane which is obtained by obstructing upper and lower edges of the standard size picture plane.

4. A camera having a rear cover with an operation member thereon, according to claim 1, wherein said camera is a water-proof/drip-proof camera in which said common operation member and said rear cover are sealed water-tight by a sealing member.

5. The camera according to claim 1, wherein said movable association member in said camera body comprises a rotary plate, and said biasing member on said camera body is concentric with the rotary plate.

6. The camera according to claim 1, wherein said movable common operation member provides a motive force for the movable association member.

7. The camera according to claim 1, wherein said association drive member is moved into engagement with the common operation member when said rear cover is closed.

8. A variable picture size camera, comprising:
a camera body;
a rear cover which opens and closes a back of said camera body;
a power switch mechanism provided in said camera body;
a picture size switching mechanism provided in said camera body, which switches a picture size between a standard picture plane and a laterally elongated picture plane in which upper and lower edges of the standard picture plane are obstructed;
a common operation member provided on said rear cover, that actuates said power switch mechanism and said picture size switching mechanism; and
an association drive mechanism that associates the operation of said common operation member with the operations of said power switch mechanism and said picture size switching mechanism when said rear cover is closed,
wherein a rotation axis of said common operation member and a rotation axis of said association drive mechanism are identical when the rear cover is closed.

9. A variable picture size camera according to claim 8, wherein said common operation member comprises a dial member which is rotatably supported by said rear cover, and wherein said association drive mechanism comprises:
a rotary plate which is supported by said camera body to rotate about the same axis as the axis of rotation of said common operation member, so that said rotary plate is rotated to carry out the ON/OFF operation of said power switch mechanism and the switching operation of said picture size switching mechanism between the standard picture plane and the laterally elongated picture plane; and
a rotation transmission mechanism for transmitting the rotation of said common operation member to said rotary plate when said rear cover is closed.

10. A variable picture size camera according to claim 9, wherein said common operation member includes three engagement positions when said rear cover is closed, and
wherein said rotary plate includes three angular positions corresponding to said three engagement positions of said common operation member and comprising a first position in which said power switch is turned OFF and second and third positions in which said power switch is turned ON; wherein the standard picture plane is held at the power-OFF position and one of the power-ON positions, and the laterally elongated picture plane is held at the other power-ON position.

11. A variable picture size camera according to claim 9, wherein said common operation member and said rotary plate are biased toward angular positions in which the operation states thereof correspond to each other and are returned to respective biasing positions when said rear cover is opened.

12. A variable picture size camera according to claim 11, wherein said common operation member and said rotary plate are biased toward angular positions corresponding to said power-OFF position.

13. A variable picture size camera according to claim 9, wherein said power switch mechanism comprises:
a plurality of electrical contacts provided in said camera body; and
electrical contact pieces provided on said rotary plate, said electrical contact pieces are selectively brought into sliding contact with said electrical contacts in accordance with the angular position of said rotary plate.

14. A variable picture size camera according to claim 9, wherein said picture size switching mechanism comprises:
a stationary standard picture plane forming member provided in front of a film surface;
a pair of light interception frames which are provided with light interception portions which can obstruct upper and lower edges of the standard picture plane and which are movable in the upward and downward direction of the standard picture plane to selectively define the standard picture plane or the laterally elongated picture plane;
a light interception frame association mechanism which moves one of said light interception frames symmetrically with the other light interception frame with respect to the center of the picture plane when the other light interception frame is moved in the upward and downward direction; and
a biasing spring which biases said light interception frames toward a position corresponding to the standard picture plane;
wherein said rotary plate being provided with an operation cam which presses a follower pin provided on one of said light interception frames at a predetermined angular position to thereby move said light interception frames to a position corresponding to the laterally elongated picture plane.

15. A variable picture size camera according to claim 8, further comprising:
a finder optical system separate from a photographing optical system;
a field frame switching device provided in said finder optical system, said field frame switching device switches a finder field corresponding to the standard picture plane and a finder field corresponding to the laterally elongated picture plane in accordance with the operation of said common operation member.

16. A variable picture size camera according to claim 15, wherein said field frame switching device mechanically moves a field frame forming member provided in said finder optical system, due to the moving force of said light interception frames.

17. A variable picture size camera according to claim 15, wherein said field frame switching device is composed of a liquid crystal display whose transparent area can be selectively varied to define a field corresponding to the standard picture plane and a field corresponding to the laterally elongated picture plane, in accordance with the voltage supplied thereto; wherein the electrical contact pieces provided on said rotary plate are in sliding contact with said electrical contact portion provided in said camera body to produce an electrical signal in accordance with the angular position of said rotary plate, whereby the voltage to be supplied to said liquid crystal display is controlled in accordance with the electrical signal to selectively form the field corresponding to the standard picture plane or the laterally elongated picture plane.

18. A variable picture size camera according to claim 8, wherein said camera is a water-proof/drip-proof camera in which said common operation member and said rear cover are sealed water-tight by a sealing member.

19. The camera according to claim 8, wherein said movable common operation member provides a motive force for the movable association mechanism.

20. The camera according to claim 8, wherein said association drive mechanism is moved into engagement with the common operation member when the rear cover is closed.

21. A variable picture size camera comprising:
a camera body;
a rear cover which opens and closes the back of said camera body;
a picture size switching mechanism provided in said camera body to switch a picture size;
a picture size varying member which is supported on the surface of said camera body opposed to said rear cover and which is reciprocally moved in opposite directions to actuate said picture size switching mechanism;
an operation member provided on said rear cover, which is selectively moved to a plurality of positions corresponding to the position and direction of the movement of said picture size varying member;
a biasing member for biasing said picture size varying member and said operation member and holding said picture size varying member and said operation member in the respective engagement positions when said rear cover is open; and
a retraction mechanism which deforms at least one said picture size varying member and said operation member so that said rear cover which has been opened can be closed when said operation member is located in a position different from the engagement position established by said biasing member.

22. A variable picture size camera according to claim 21, said retraction mechanism comprising:
an elastically deformable plate having a free end, which is provided on said picture size varying member and which is deformable in the direction substantially perpendicular to a plane defined by the movement of said picture size varying member; and
an insertion projection provided on said operation member, which is inserted in said camera body when said rear cover is closed;
wherein said insertion projection can be engaged by the free end of said elastically deformable plate so as to transmit the movement of said operation member to said picture size varying member when said operation member is located in the engagement position by said biasing member upon closure of said rear cover, and
wherein said insertion projection is adapted to press and deform said elastically deformable plate in the direction substantially perpendicular to plane of the movement of said picture size varying member when said operation member is located in a position other than the engagement position upon closure of said rear cover.

23. A variable picture size camera according to claim 22, wherein said elastically deformable plate is bent at the body portion of said picture size varying member so that said elastically deformable plate extends close to said rear cover toward the free end thereof.

24. A variable picture size camera according to claim 23, wherein said insertion projection of said operation member is provided with an arched surface portion which can contact with said elastically deformable plate to press and move the bent portion thereof.

25. A variable picture size camera according to claim 23, wherein said picture size switching mechanism can switch the picture plane between the standard picture plane and the laterally elongated picture plane which is defined by an obstruction of upper and lower edges of the standard picture plane, and said biasing member biases said operation member and said picture size varying member toward respective standard picture plane forming positions,
whereby upon closure of said rear cover which has been opened, said insertion projection is inserted in said camera body due to the presence of the bent portion without deforming said elastically deformable plate when said operation member is held in a laterally elongated picture plane forming position, and said insertion projection presses and deforms the bent portion of the elastically deformable plate when said operation member is returned from the laterally elongated picture plane forming position to the engagement position.

26. A variable picture size camera according to claim 22, wherein said camera body is provided therein with a contact plate for an electric switch, and
wherein said elastically deformable plate is formed with electrical contact pieces integral therewith, which are in sliding contact with said contact plate in accordance with the movement of said picture size varying member.

27. A variable picture size camera according to claim 21, wherein said operation member and said picture size varying member are supported on said rear cover and said camera body so as to rotate about the same axis.

28. A camera having a rear cover with an operation member thereon, comprising:
an operation mechanism provided on a camera body;
a moving member which is supported on the surface of said camera body that is opposed to said rear cover and which is reciprocally moved in opposite directions to actuate said operation mechanism;
an operation member on said rear cover, which is selectively moved to a plurality of moving positions corresponding to the directions and positions of said moving member;
a biasing member which biases and moves said moving member and said operation member and which holds said moving member and said operation member in an engagement position when said rear cover is opened; and
a retraction mechanism for deforming at least one of said moving member and said operation member which is located in a position other than the engagement position, upon closure of said rear cover which has been opened, to thereby permit said rear cover to be closed.

* * * * *